(12) United States Patent
Tomioka

(10) Patent No.: US 10,523,288 B2
(45) Date of Patent: Dec. 31, 2019

(54) WIRELESS RECEIVER, WIRELESS RECEIVING METHOD, AND WIRELESS SYSTEM

(71) Applicant: KABUSHIKI KAISHA TOSHIBA, Minato-ku, Tokyo (JP)

(72) Inventor: Tazuko Tomioka, Kawasaki Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 16/116,525

(22) Filed: Aug. 29, 2018

(65) Prior Publication Data

US 2019/0280740 A1    Sep. 12, 2019

(30) Foreign Application Priority Data

Mar. 12, 2018  (JP) .................................. 2018-044019

(51) Int. Cl.
*H04L 7/08* (2006.01)
*H04B 7/0426* (2017.01)
*G01S 3/74* (2006.01)
*H04B 7/08* (2006.01)
*H04B 7/06* (2006.01)

(52) U.S. Cl.
CPC ............... *H04B 7/043* (2013.01); *G01S 3/74* (2013.01); *H04B 7/0634* (2013.01); *H04B 7/086* (2013.01)

(58) Field of Classification Search
CPC ...... H04B 7/043; H04B 7/0634; H04B 7/086; G01S 3/74
USPC ................................. 375/267, 299, 316, 377
See application file for complete search history.

(56) References Cited

U.S. PATENT DOCUMENTS

| | | | |
|---|---|---|---|
| 7,358,891 B2* | 4/2008 | Struckman | G01S 3/146 342/148 |
| 2018/0011169 A1* | 1/2018 | Nakayama | G01S 7/292 |
| 2018/0011180 A1* | 1/2018 | Warnick | H01Q 3/34 |

FOREIGN PATENT DOCUMENTS

| | | |
|---|---|---|
| JP | 2005-283167 A | 10/2005 |
| JP | 2014-119343 A | 6/2014 |

OTHER PUBLICATIONS

Borden, "Diversity Methods in Phase Monopulse Tracking—A New Approach," IEEE Transactions on Aerospace and Electronic Systems, (1991) vol. 27, No. 6, pp. 877-880.
Borden, "Requirements for Optimal Glint Reduction by Diversity Methods," IEEE Transactions on Aerospace and Electronic Systems, (Oct. 1994) vol. 30, No. 4, pp. 1108-1114.
Borden, "What is the Radar Tracking "Glint" Problem and can it be Solved?" DTIC Document, AD-A266509, (May 1993), pp. 1-12.

(Continued)

*Primary Examiner* — Tesfaldet Bocure
(74) *Attorney, Agent, or Firm* — Foley & Lardner LLP

(57) ABSTRACT

A wireless receiver includes an antenna array and processing circuitry. The antenna array receives radio waves from a radio wave radiator to output received signals. The processing circuitry calculates similarity indices based on (1) a first eigenvector corresponding to a largest eigenvalue of a covariance matrix of each of the received signals, and (2) a degree of similarity between the first eigenvector and a steering vector of a single wave, estimates angles of arrival of the received signals, and determines an output angle of arrival from the estimated angles of arrival of the received signals.

15 Claims, 18 Drawing Sheets

(56) References Cited

OTHER PUBLICATIONS

Hewer et al., "Robust Preprocessing for Kalman Filtering of Glint Noise," IEEE Transactions on Aerospace and Electronic Systems, (Jan. 1987) vol. AES-23, No. 1, pp. 120-128.

Loomis III, et. al., "Frequency-Agility Processing to Reduce Radar Glint Pointing Error," IEEE Transactions on Aerospace and Electronic Systems, (Nov. 1974) vol. AES-10, No. 6, pp. 811-820.

Martin et al., "Robust Resistant Spectrum Estimation," Proceedings of the IEEE, (Sep. 1982) vol. 70, No. 9, pp. 1097-1115.

Tomioka et al., "Angular Error Quantification of Frequency Agility Radar with Large Power Pulse Selection," The Institute of Electronics, Information and Communication Engineers Technical Report SANE2014-3 (Apr. 2014) vol. 14, No. 20, pp. 13-18.

\* cited by examiner

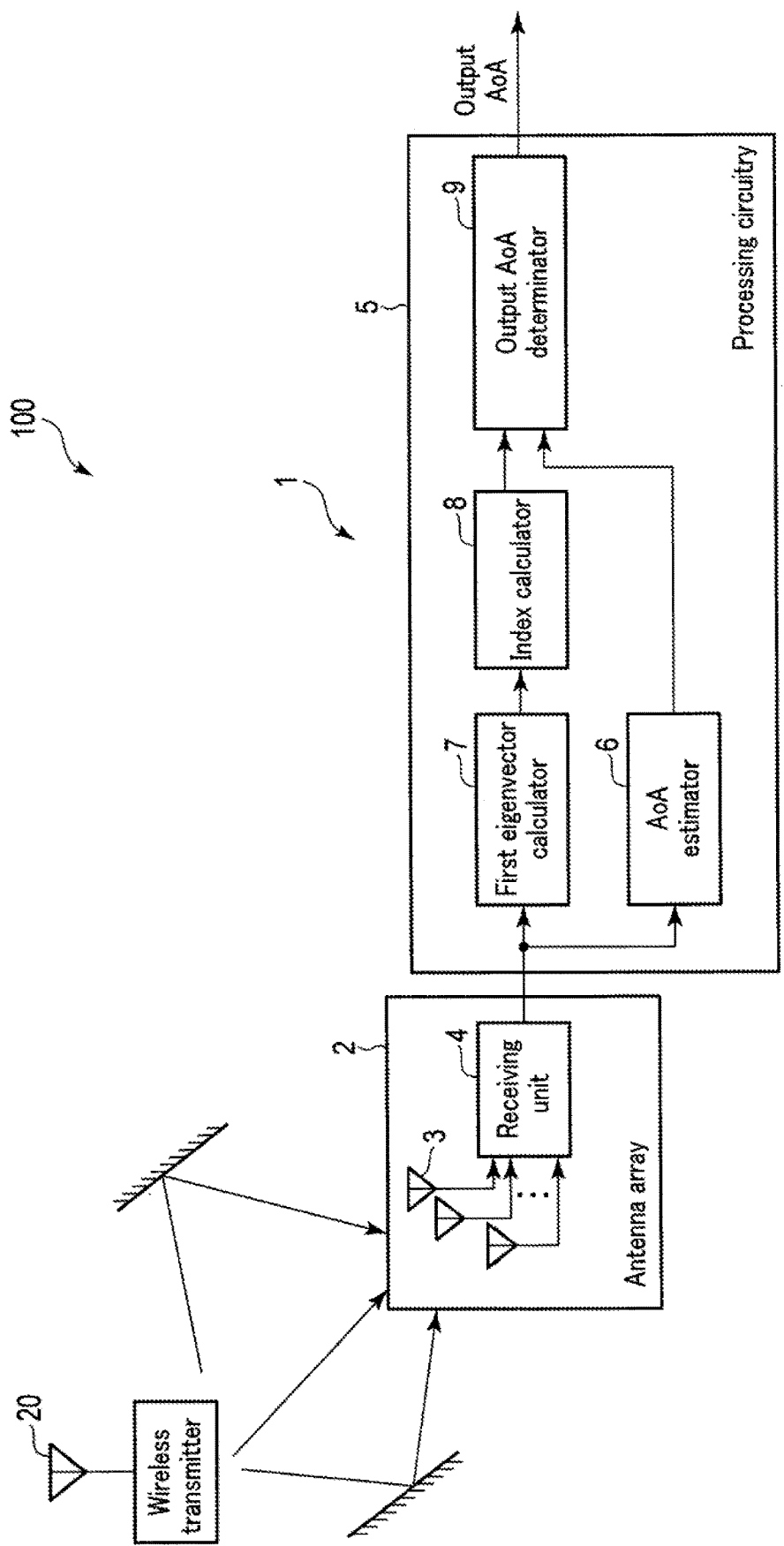
F I G. 1

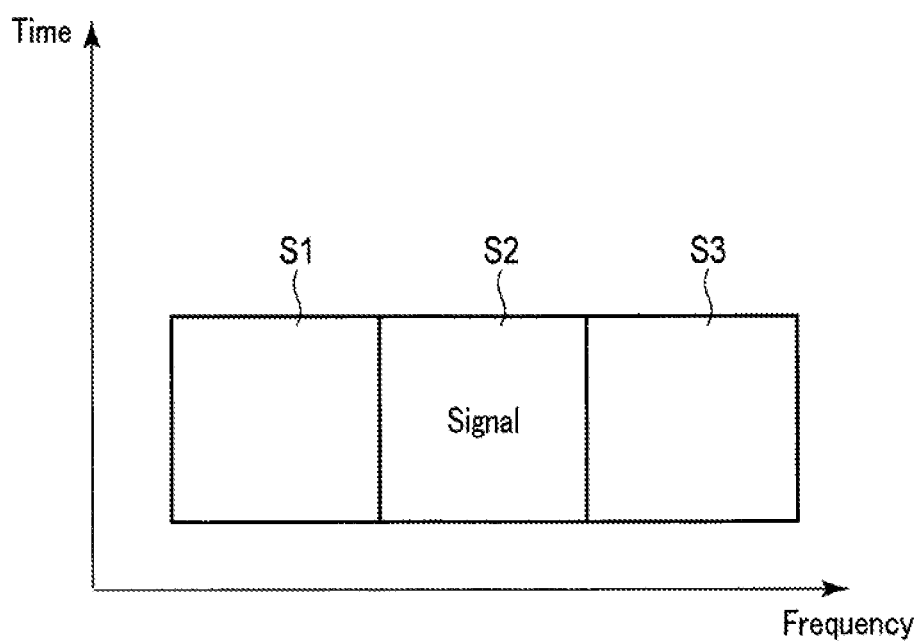
F I G. 5

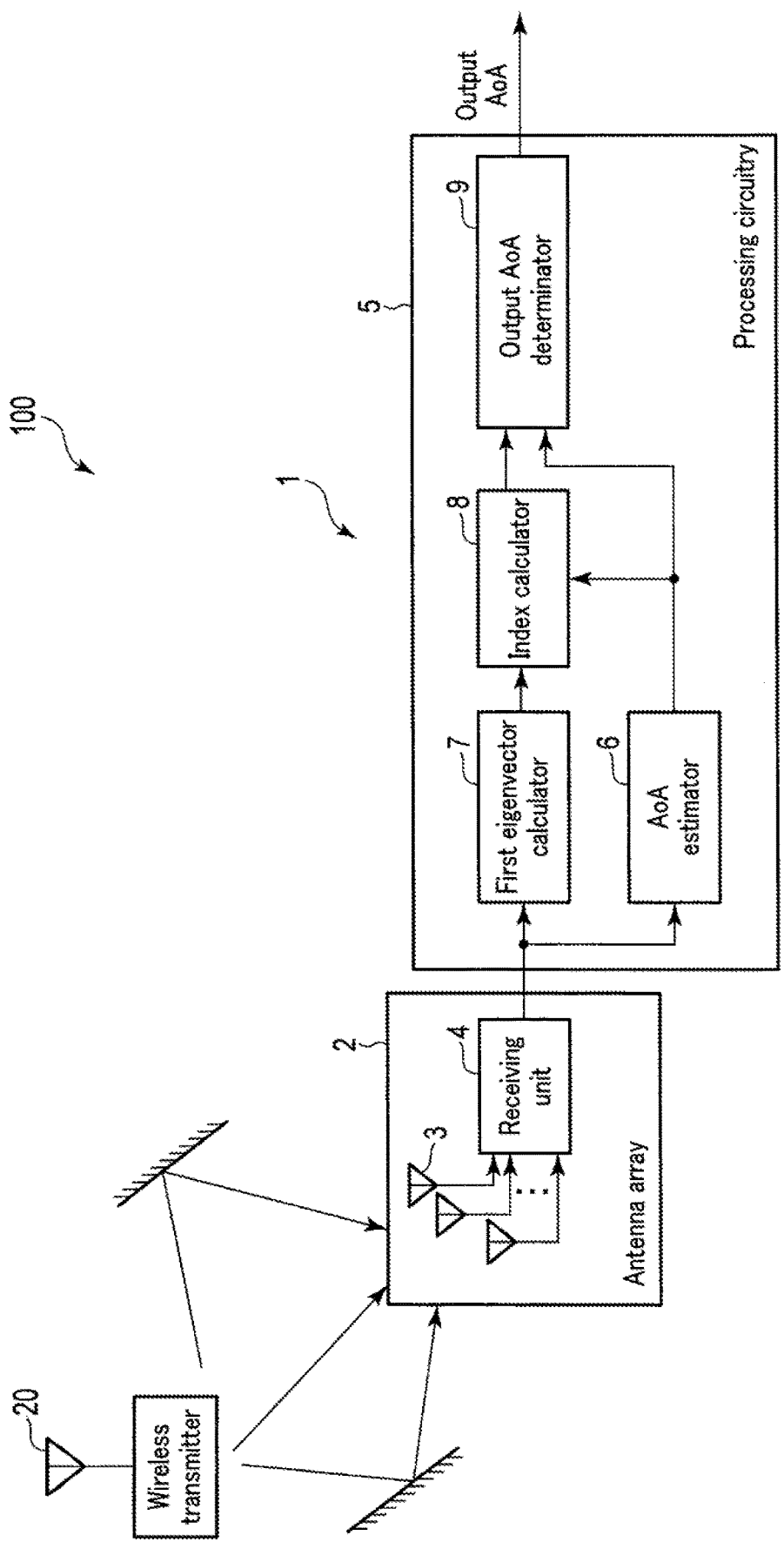
F I G. 6

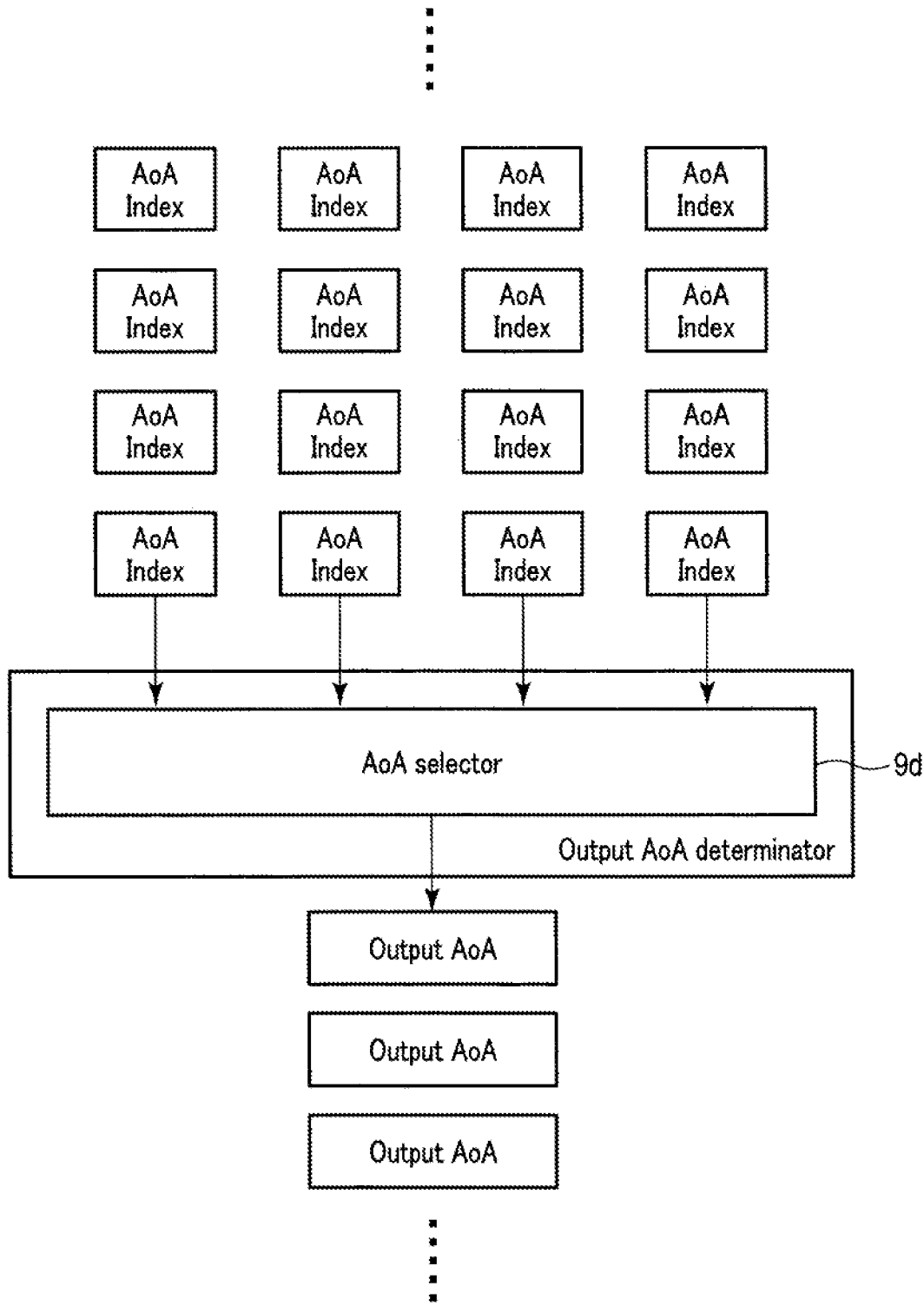
F I G. 11

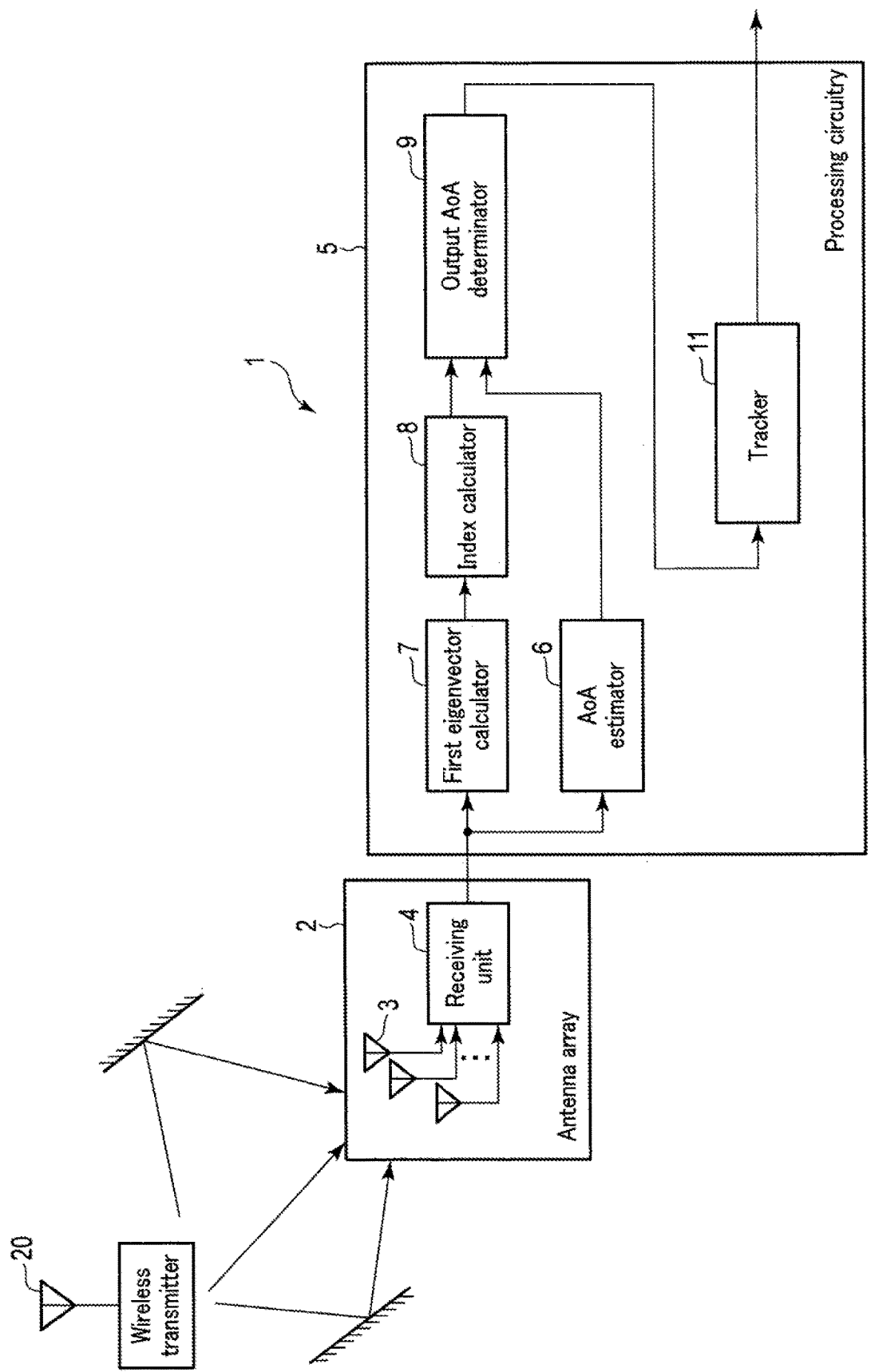
F I G. 15

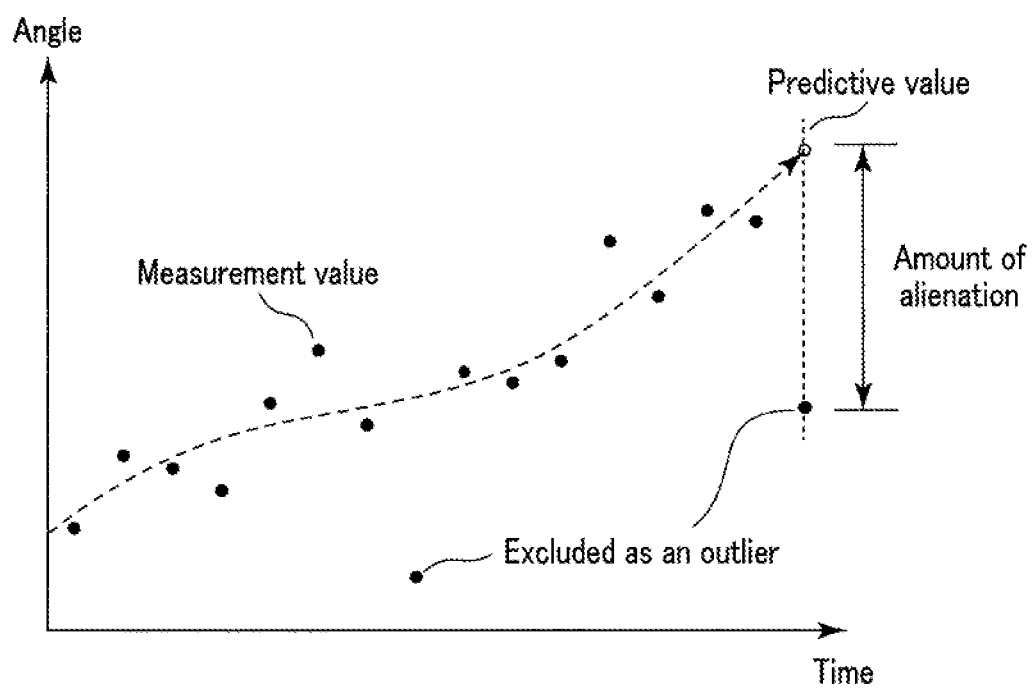
F I G. 16

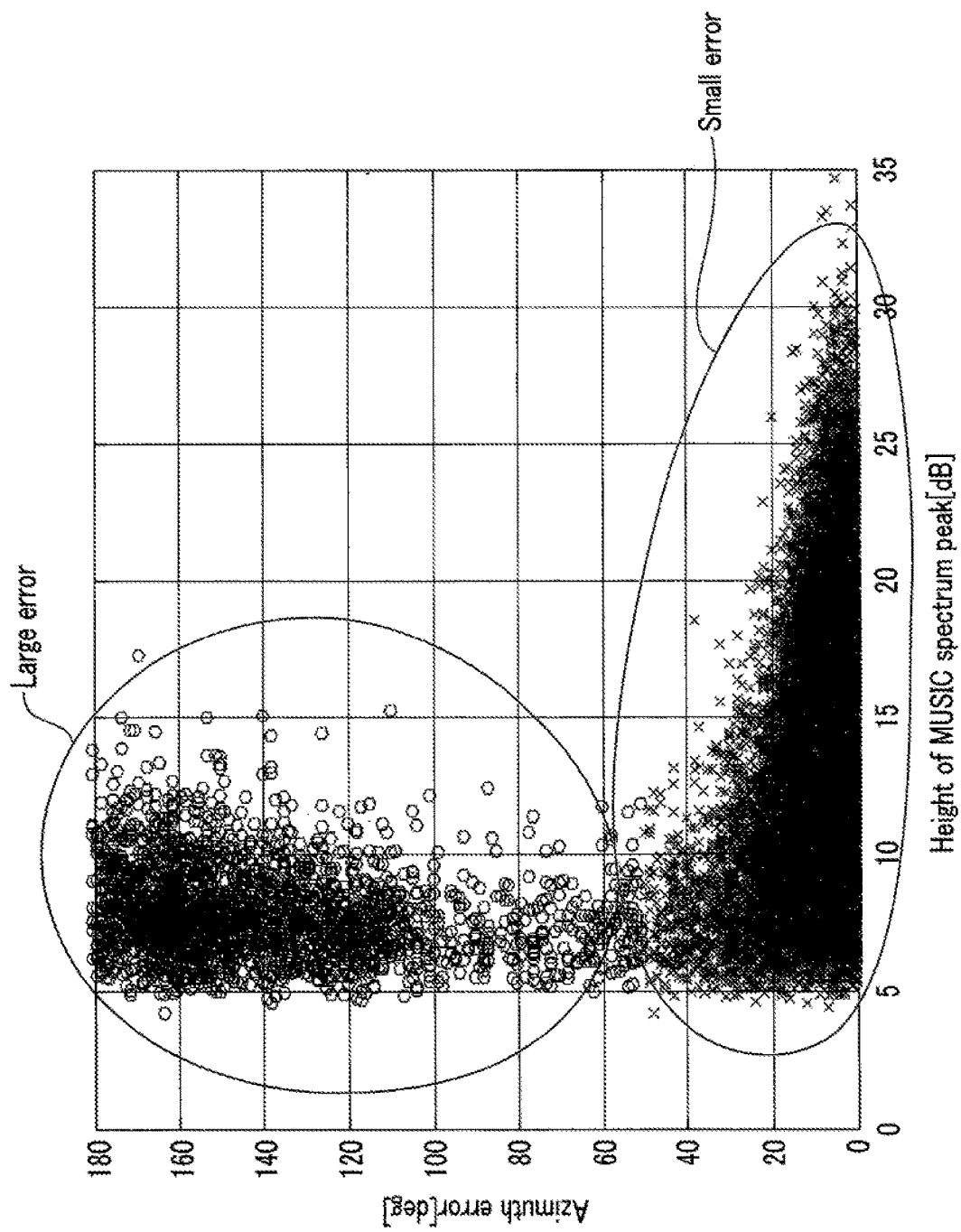
F I G. 17

WIRELESS RECEIVER, WIRELESS RECEIVING METHOD, AND WIRELESS SYSTEM

CROSS-REFERENCE TO RELATED APPLICATIONS

This application is based upon and claims the benefit of priority from the Japanese Patent Application No. 2018-044019, filed Mar. 12, 2018, the entire contents of which are incorporated herein by reference.

FIELD

Embodiments described herein relate to a wireless receiver, a wireless receiving method, and a wireless system.

BACKGROUND

According to IoT technology development, wireless tags are expected to be used in various scenes. It is already known that a system of detecting a position of a wireless tag by a wireless receiver exists. In this type of system, the orientation of a wireless tag needs to be detected in order to estimate the position of the wireless tag by a single wireless receiver.

There are methods of detecting the orientation of an object that emits radio waves using an antenna array. In these methods, the direction of arrival of radio waves is estimated based on the phase difference of received signals between antenna elements. The Multiple Signal Classification (MUSIC) method is a representative method of these technique.

With the methods using antenna array, in multipath environment, i.e., when multiple waves having coherence arrive, it is difficult to separate the multiple waves. The position detection of wireless tags is mainly performed inside buildings. Multipath is inevitable in indoor environments.

With antenna arrays of particular shapes, the multiple waves stemming from multipath can be separated by using spatial smoothing. However, the shapes of antenna are limited, and the greater number of antennas should be used. In addition, resolution will be degraded. Accordingly, the spatial smoothing is not suitable for the case where the number of antennas is less.

On the other hand, there is a different approach related to radar. It is already known that in the case where signals having different frequencies are transmitted and received, an error in angle of arrival (AoA) detected from a pulse having the largest received power is the statistically minimum. This method can be applied to detection of an AoA of a wireless tag in a system which frequency hopping is adopted, for example, Bluetooth (registered trademark).

However, in general, the frequencies of signals transmitted from a wireless tag change at long-term intervals, differently from radar. In addition, in the case where a person carries a wireless tag, the orientation of the wireless tag may change over time. If the orientation of the wireless tag changes, the conditions such as an antenna gain and polarization, etc., also change from the conditions under the previous frequency. In the case where a person carries a wireless tag, power may change due to factors other than the change in multipath interference state. If power changes due to factors other than the change in multipath interference state, an AoA may not be accurately selected based on the power.

BRIEF DESCRIPTION OF THE DRAWINGS

FIG. 1 illustrates the configuration of a wireless system according to an embodiment.

FIG. 5 illustrates example measurements using a broadband signal.

FIG. 6 illustrates the configuration of a wireless system in that an AoA is used for calculation of an index.

FIG. 11 is a diagram to explain another example of the processing in the output AoA determinator.

FIG. 15 illustrates the configuration of a wireless system in which processing circuitry is configured to track an output AoA.

FIG. 16 is an illustration of the processing of excluding outliers.

FIG. 17 is a graph where the abscissa represents the height of MUSIC spectrum peak and the ordinate represents an azimuth error, in which data shown in FIG. 14 is plotted.

DETAILED DESCRIPTION

Figure 2A:
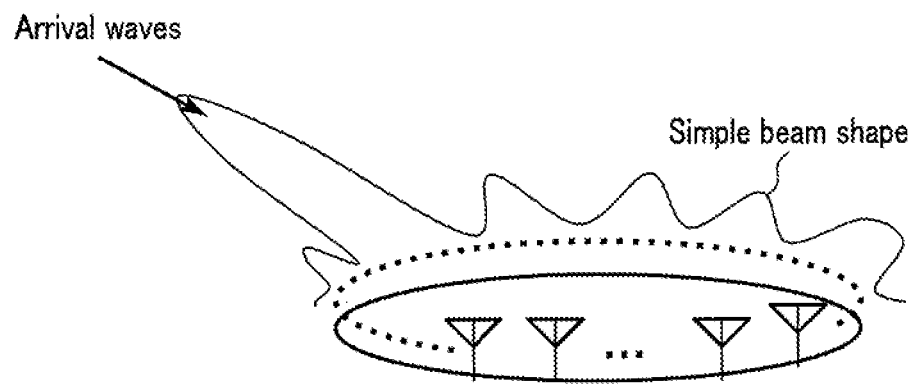
FIG. 2A is an illustration of a beam shape generated by a steering vector.

According to one embodiment, a wireless receiver includes an antenna array and processing circuitry. The antenna array receives radio waves from a radio wave radiator to output received signals. The processing circuitry calculates similarity indices based on (1) a first eigenvector corresponding to a largest eigenvalue of a covariance matrix of each of the received signals, and (2) a degree of similarity between the first eigenvector and a steering vector of a single wave, estimates angles of arrival of the received signals, and determines an output angle of arrival from the estimated angles of arrival of the received signals.

Hereinafter, embodiments will be described with reference to the drawings. In the following descriptions, illustrations and explanations for unnecessary parts of embodiments will be omitted.

FIG. 1 illustrates the configuration of a wireless system according to an embodiment. A wireless system 100 according to an embodiment includes a wireless receiver 1 and a wireless transmitter 20. The wireless receiver 1 is configured to receive radio waves from the wireless transmitter 20.

The wireless receiver 1 includes an antenna array unit 2. The antenna array unit 2 includes an antenna array 3 and a receiving unit 4.

The antenna array 3 includes a plurality of antenna elements. The antenna array 3 receives radio waves from the wireless transmitter 20, and outputs a received signal in accordance with the received radio waves.

The receiving unit 4 processes a signal output from the antenna array 3. The receiving unit 4 includes various types of circuitry for executing various receiving processings in physical layer, such as amplification, filtering, baseband conversion, and A/D (analog to digital) conversion. The receiving unit 4 may include circuitry for executing processing in a protocol layer of digital signals, such as error detection and correction, packet reading, etc., if required. The receiving unit 4 may include receiving systems of an equal number to the antenna elements, for example. The receiving unit 4 may include a receiving system such as Bluetooth standards and time-sequentially switch antenna elements to be coupled to the receiving system.

The wireless receiver 1 includes processing circuitry 5. The processing circuitry 5 includes a digital signal processor such as a CPU, an ASIC, an FPGA, or a DSP, for example. The processing circuitry 5 may include a memory such as a DRAM, an SRAM, etc. The processing circuitry 5 may include a plurality of digital signal processors or memories.

The processing circuitry 5 processes a received signal output from the receiving unit 4. The received signal output from the receiving unit 4 is an RF (radio frequency) signal or a baseband signal of a complex number defined by equation (1) below.

$$X(n) = [x_1(n), x_2(n), \ldots, x_K(n)]^T \quad (1)$$

In equation (1), "T" indicates a transpose of a matrix, "n" represents a sample number of a received signal, "K" represents the number of antenna elements, and "$x_1, x_2, \ldots x_K$" represents a received signal of each antenna element.

The processing circuitry 5 includes an AoA estimator 6, a first eigenvector calculator 7, an index calculator 8, and an output AoA determinator 9. The AoA estimator 6, the first eigenvector calculator 7, the index calculator 8, and the output AoA determinator 9 are constructed by software, for example. The AoA estimator 6, the first eigenvector calculator 7, the index calculator 8, and the output AoA determinator 9 may be constructed by hardware.

The AoA estimator 6 estimates an AoA which indicates a direction from where radio waves arrive, based on the received signal. The AoA estimator 6 estimates an AoA by a method involving eigenvalue decomposition of a covariance matrix of a received signal, such as MUSIC algorithm, etc. The AoA estimator 6 may estimate an AoA by monopulse method or beamformer method, for example. If beamformer method is applied, eigenvalue decomposition is not necessary. If monopulse method is applied, creation of a covariance matrix is also not necessary.

The first eigenvector calculator 7 calculates a first eigenvector of the covariance matrix of a received signal. The first eigenvector is an eigenvector corresponding to the largest eigenvalue obtained by performing eigenvalue decomposition to the covariance matrix. In the case where a received signal is represented by equation (1), a covariance matrix $R_{xx}$ is generated based on equation (2) below.

$$R_{xx} \equiv \sum_n X(n) X^H(n) \quad (2)$$

In equation (2), "H" indicates a complex conjugate transpose (Hermitian conjugate). If the covariance matrix $R_{xx}$ is subjected to eigenvalue decomposition, the covariance matrix $R_{xx}$ is decomposed into an eigenvector matrix E which has column vectors of norm 1 which is an orthonormal system, and an eigenvalue matrix $\Lambda$ which has eigenvalues for main diagonal elements and zero for the other elements, as shown in equation (3).

$$R_{xx} = E \Lambda E^H \quad (3)$$

Each column of the matrix E is multiplied by one non-zero element of the matrix $\Lambda$. The column in the matrix E multiplied by the largest element of the matrix $\Lambda$ is the first eigenvector.

The first eigenvector may be calculated by performing complete eigenvalue decomposition to the covariance matrix. The first eigenvector may be calculated by obtaining only an eigenvector corresponding to the largest eigenvalue by the power iteration, etc.

The index calculator 8 calculates an index indicating the degree of similarity between the first eigenvector output from the first eigenvector calculator 7 and the steering vector of a single wave. The index indicates whether the first eigenvector is similar to the steering vector of the single wave. The index will be explained below. The steering vector is defined by equation (4).

$$a(\Theta) = [a_1(\Theta), a_2(\Theta), \ldots, a_K(\Theta)]^T \quad (4)$$

In equation (4), "$\Theta$" is a set of parameters that define an antenna response. The parameters defined by "$\Theta$" may change depending on the number of dimensions of space required for measuring an AoA, etc. "$\Theta$" may indicate only an azimuth, or a pair of an azimuth and an elevation angle. "$\Theta$" may include parameters other than an azimuth and an elevation angle, for example, a polarization state or a distance. In the following descriptions, it is assumed that "$\Theta$" indicates an angle set including a pair of an azimuth and an elevation angle. The element "$a_k(\Theta)$ (k=1, . . . , K)" indicates a response from an antenna element k relative to the reference point when a single wave is input from an angle $\Theta$, and is a complex number possessing an amplitude and a phase. The amplitude is a relative amplitude between antenna elements in which the entire vector is normalized so that the norm of a ($\Theta$) is 1 or $\sqrt{K}$. The phase indicates the phase of the wave entered from an angle $\Theta$ measured from the reference point. If the antenna array 3 is a linear antenna array, the reference point is any point on an array line, for example. If the antenna array 3 is a circular antenna array, the reference point is the center of the circle, for example. The reference point is not limited thereto.

The steering vector is a response to a single wave, namely, a plane wave entered from the angle $\Theta$. Accordingly, the steering vector has a simple phase relationship corresponding to the plane wave. On the other hand, the eigenvector is obtained by decomposing the original covariance matrix to an orthonormal system. Accordingly, the original covariance matrix of a received signal is decomposed into components orthogonal to each other, namely components having no correlation. For example, non-coherent signal modulated by different data arrived from different directions or noises are decomposed into different sets of eigenvalue and eigenvector.

A multipath signal indicates waves generated from a wave reflected or diffracted on various places, etc., which arrive at antenna elements with different delay amounts and from different directions. The origin of waves which arrive at antenna elements is a single signal. Consequently, it is likely that coherence is present between the waves depending on the delay amounts. Accordingly, in the case where the modulation rate of waves is low, or the waves are continuous waves (CW), it is likely that a multipath signal will not be decomposed into different eigenvalues via eigenvalue decomposition, unless a special processing such as spatial smoothing is performed. Thus, in many cases, multipath signals which arrive from different angles are subjected to eigenvalue decomposition to obtain one eigenvalue as a combined wave.

If a received signal has only one directional signal, which is a desired multipath signal, or the power of the desired wave is sufficiently greater than other waves and is suitable or demodulation, the largest eigenvalue is mainly an eigenvalue of the desired wave, and a first eigenvector is an eigenvector corresponding to the desired wave.

If the desired wave is not a multipath signal, and if the received signal does not include an interfering wave having greater power, the first eigenvector represents a response of an antenna element corresponding substantially to a plane wave. Such a first eigenvector is substantially equivalent to the steering vector with the AoA of the desired wave. In practice, the first eigenvector is substantially equal to the steering vector normalized into norm 1. However, the steering vector and the eigenvector merely indicate correlation between antenna elements. Accordingly, it may be possible that the same phase change is applied to the entire vector. On the other hand, if the desired wave is a multipath signal, the first eigenvector represents responses of antenna elements corresponding to a wave in which all paths are combined.

Figure 2B:
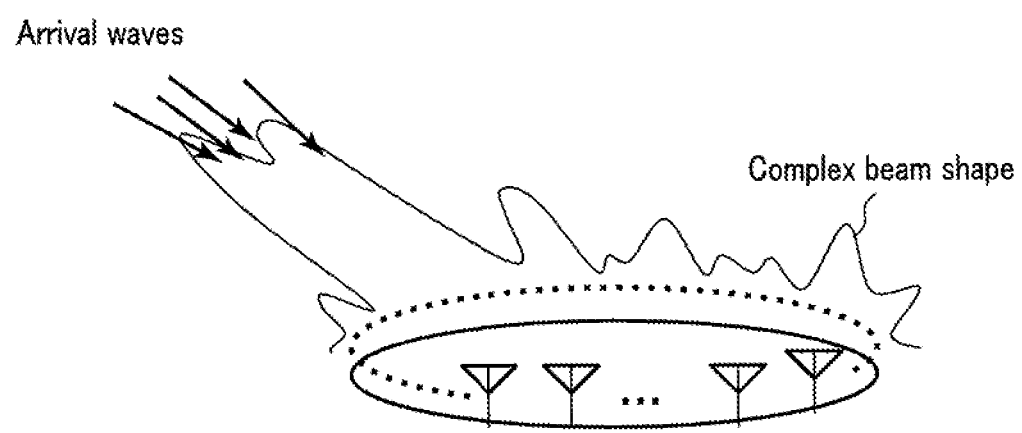
FIG. 2B is an illustration of a beam shape generated by a first eigenvector in the case where a desired wave is a multipath signal.

The steering vector corresponding to a plane wave and the first eigenvector corresponding to a multipath signal can be beam weights that effectively extracts the corresponding signals. In the following descriptions, with reference to FIGS. 2A and 2B, the degree of similarity between the steering vector and the first eigenvector will be explained by using the beam shapes generated by the steering vector and the first eigenvector of a multipath signal. In FIGS. 2A and 2B, the antenna array is a circular antenna array. However, the explanations with reference to FIGS. 2A and 2B can be applied to any antenna array having a shape other than circle.

FIG. 2A is an illustration of a beam shape generated by a steering vector. As shown in FIG. 2A, a beam generated by the steering vector has a simple shape which projects toward the direction of arrival of the wave. The beam shape generated by the steering vector also has sidelobes projected toward directions other than the wave direction. However, the sidelobes of the beam generated by the steering vector are small and have a regular shape. FIG. 2B is an illustration of a beam shape generated by the first eigenvector in the case where the desired wave is a multipath signal. As shown in FIG. 2B, the desired waves with multipath component arrive from multiple directions. Accordingly, the beam has a complex shape. In addition, in order to form the complex shape by finite number of antenna elements and finite antenna diameters, the shape of sidelobes become also complex and the strengths of them are relatively large. As can be seen from FIGS. 2A and 2B, the beam shape generated by the first eigenvector in the case where a great number of multipath components are included is completely different from the beam shape generated by a steering vector.

Thus, an index indicating whether the first eigenvector is similar to the steering vector is adopted as the index indicating whether or not the strongest component included in the covariance matrix is a single wave. Naturally, there are cases in which a non-line-of-sight component reflected on a wall of a large area, etc. among the plurality of paths of the multipath is greater than a line-of-sight component of which AoA one desires to detect, or where the first eigenvector is accidentally similar to the steering vector of an angle deviated from the angle of the line-of-sight component. Accordingly, the index indicating the degree of similarity between the first eigenvector and a steering vector is not a perfect index for the accuracy of the estimated AoA. However, the index indicating the degree of similarity between the first eigenvector and a single wave steering vector can be an index of the amount of non-line-of sight components included in a desired wave. Namely, if the degree of similarity is greater, it is likely that the number of paths of the multipath may be less, or that non-line-of-sight components are eliminated by interference between the components. Accordingly, the reliability of the estimated AoA is statistically high.

In addition, both a steering vector and an eigenvector have a normalized length. Accordingly, the degree of similarity is unaffected by a change in power. Thus, it is possible to determine the reliability of the estimated AoA without being affected by a change in the orientation of the wireless tag comprised by the wireless transmitter 20, etc.

As stated above, the index calculator 8 calculates an index indicating the degree of similarity between the first eigenvector output from the first eigenvector calculator 7 and a single wave steering vector. The index calculator 8 outputs the calculated index to the output AoA determinator 9.

The output AoA determinator 9 determines one or more output AoAs based on the plurality of AoAs obtained as the results of measurements and the similarity indices corresponding to the AoAs. In the embodiment shown in FIG. 1, the output AoA is a final AoA output from the processing circuitry 5. The measurements include calculation of the first eigenvector, estimation of an AoA, and calculation of an index, performed for each received signal having different signal conditions such as time, frequency, the position of the wireless receiver 1, or a position of the wireless transmitter 20, etc. The output AoA determinator 9 determines one or more output AoAs based on a combination of an AoA and an index obtained as the results of the measurements. The details of the processing by the output AoA determinator 9 will be described later.

The wireless transmitter 20 emits radio waves for communication. The wireless transmitter 20 is, for example, a wireless tag. In the present embodiment, the wireless transmitter 20 may be replaced with a general radio wave radiator that radiates radio waves. The radio wave radiator may include, for example, an electronic device that radiates electromagnetic noises, such as a microwave oven. The radio wave radiator includes a radar target that does not emit radio waves. In this case, the wireless receiver 1 is a radar receiver which receives radio waves reflected by the radar target.

In the present embodiment, the measurements taken in different signal conditions such as time, frequency, the position of the wireless receiver 1, or a position of the wireless transmitter 20, etc. are performed for determining the output AoA. In the following descriptions, an example of the measurements will be explained.

Figure 3:
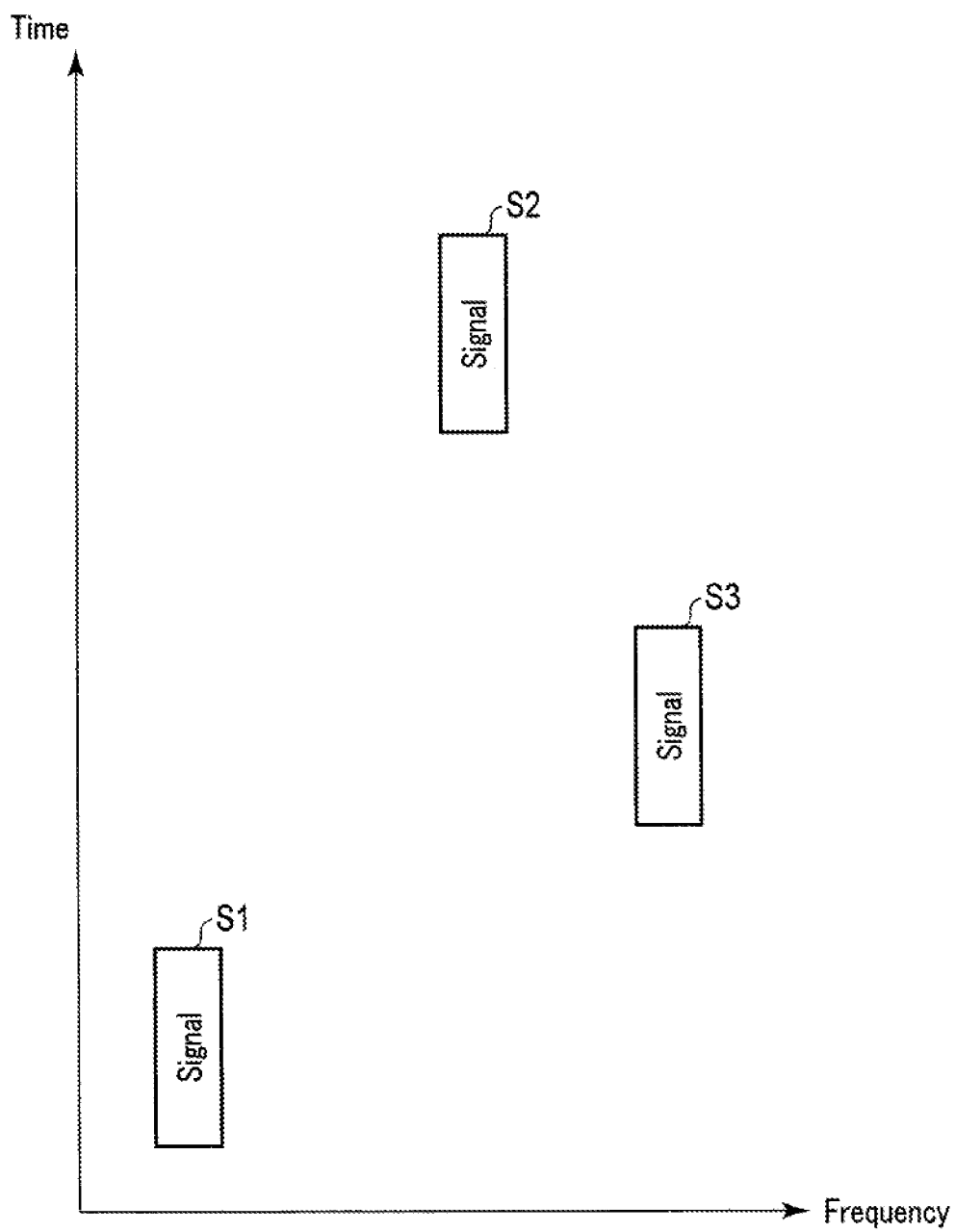
FIG. 3 illustrates example measurements performed using frequency hopping.

FIG. 3 illustrates an example of the measurements using frequency hopping. The frequency hopping may be used, for example, in the case where the wireless transmitter 20 is a Bluetooth device. In FIG. 3, the abscissa axis represents frequencies, and the ordinate represents time. In frequency hopping, the wireless transmitter 20 transmits signals (packets) S1, S2, and S3 having different frequencies at different time. The wireless receiver 1 performs estimation of an AoA at the AoA estimator 6, and calculation of an index at the index calculator 8, every time each of signal S1, S2, and S3 is received.

Figure 4:
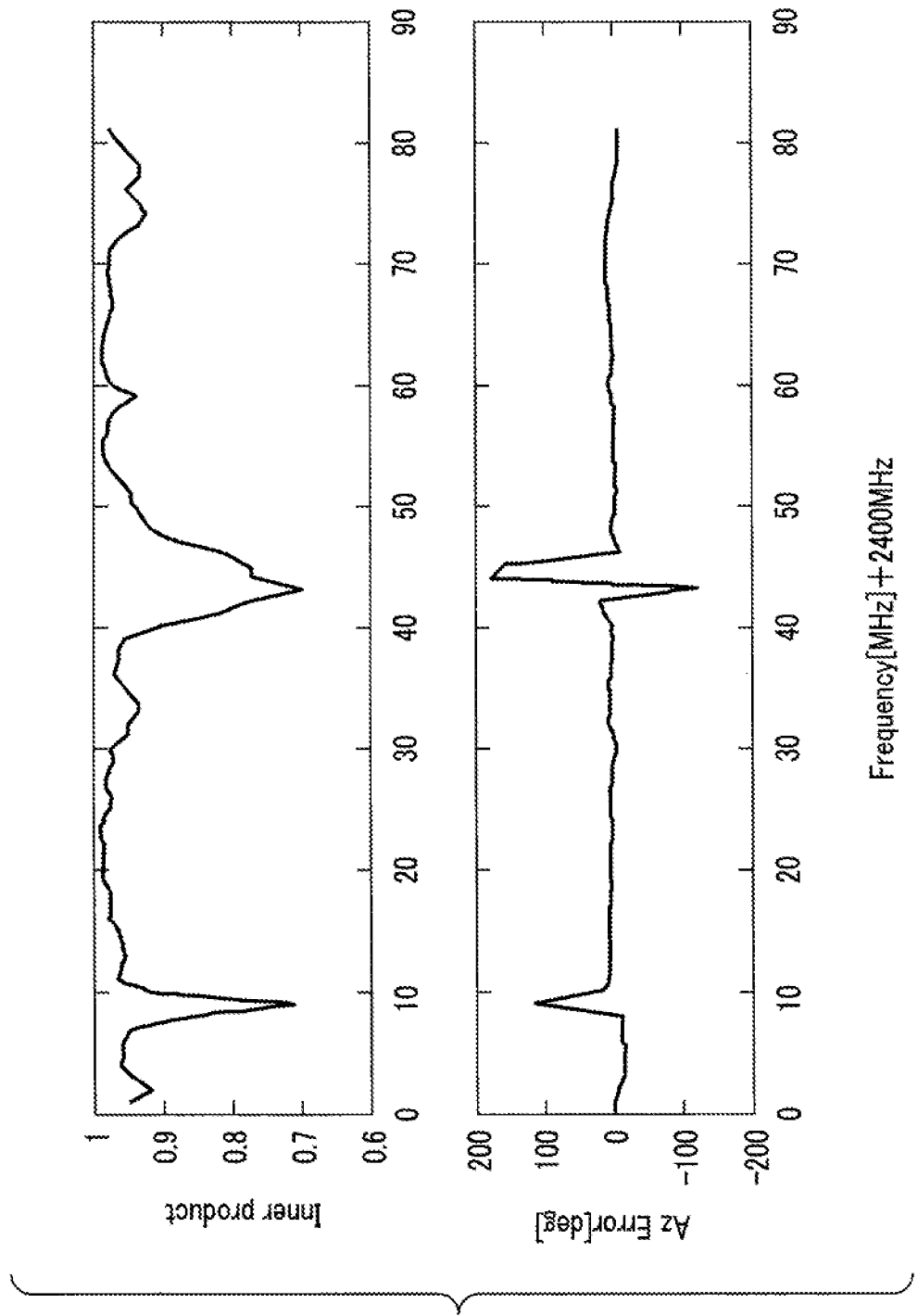
FIG. 4 illustrates graphs showing values of the similarity index and estimation errors of the azimuth of corresponding arrival waves when frequency changes.

FIG. 4 consists of graphs showing values of the similarity index (absolute value of an inner product, described below) and estimation errors of the azimuth of corresponding arrival waves (Az) when frequency changes. As shown in FIG. 4, the value of error changes in accordance with the change in frequency. This is because the interfering state of the multipath (i.e., the phase difference between paths) changes as the frequency changes. The change in the interfering state of the multipath in accordance with the frequency is referred to as frequency selective fading.

In the example shown in FIG. 4, the estimation error essentially stays around 0 degrees, but sometimes becomes greater. The estimated AoA when the estimation error exhibits a greater value is assumed to be an outlier. If the estimated AoA is an outlier, the absolute value of an inner product shows a smaller value. Accordingly, by selecting an AoA based on the absolute value of an inner product used as the similarity index, it is possible to exclude an outlier, or to reduce an influence of an outlier by performing weighting synthesis.

FIG. 5 illustrates example measurements using a broadband signal. When a broadband signal is used, the wireless transmitter 20 transmits a single signal of a broader frequency range at the same time. The frequency selective fading causes different losses for different frequencies in the broadband signal. Accordingly, the broadband signal subjected to bandwidth division can be processed as signals S1, S2 and S3 each having a different frequency, in a similar manner to the frequency hopping signal.

Next, examples of some indices will be explained. As stated above, the index indicating the degree of similarity between a single wave steering vector and the first eigenvector includes the absolute value of the inner product thereof. The steering vector and the first eigenvector are vectors in a complex multi-dimensional space. Similar to vectors in the two-dimensional or three-dimensional of real number space, the inner product of two vectors indicates a similarity between points represented by the vectors.

In the present embodiment, the norm of a steering vector is 1; namely, the steering vector length is normalized to the same value as an eigenvector. In the present embodiment, if steering vectors and eigenvectors are always normalized to the same values respectively, the norms of these vectors need not to be 1.

Elements of A steering vector and the first eigenvector correspond to responses of antenna elements. Accordingly, regarding the phase, the phase difference between elements should be taken into account, but the common phase multiplied to all the elements of a vector should not be taken into account when measuring the degree of similarity. However, if an inner product is obtained, the common phases of vectors remains. Accordingly, in the present embodiment, it is merely evaluated whether the shapes of two vectors are similar to each other based on the absolute value obtained after the inner product is calculated. The inner product used as the index is given by equation (5), where "$e_1$" represents the first eigenvector.

$$|a(\Theta)^H e_1| \quad (5)$$

The index indicating the degree of similarity between the first eigenvector and a single wave steering vector need not to be the inner product. The index indicating the degree of similarity between the first eigenvector and the single wave steering vector may include the distance between the two vectors. The distance between two vectors is deemed to be a length of vector obtained by subtracting one vector from the other. In order to detect the similarity in the shape of the two vectors, it is necessary to make the lengths of two vectors equal before subtraction. In the complex space, the common phases of the elements of the vectors is reflected in the distance. Accordingly, it is necessary to eliminate an influence of the common-to-all-element phases in advance. For example, the phase difference remaining before obtaining the absolute value in the aforementioned inner product calculation corresponds to the phase difference of the two vectors. The common-phase difference between two vectors may be corrected by using the phase difference before subtraction.

An index indicating the degree of similarity between the first eigenvector and a single wave steering vector may be comprised of amplitude variations between elements of the first eigenvector, as applied in Jpn. Pat. Appln. KOKAI Publication No. 2014-119343, if there is no gain variation between antenna elements. In this example, it is assumed that the amplitude of each element of a single wave steering vector is equal. In this case, the amplitude variation of the elements of the first eigenvector can be the degree of similarity between the first eigenvector and a single wave steering vector. If the amplitude variation of the first eigenvector is used as the index, it is not necessary to obtain a single wave steering vector.

If the absolute value of the inner product is used as the index, the amplitude of each element of a steering vector may vary. In many cases, in the antenna array, there is a difference in the antenna gain of each antenna element due to coupling of antenna elements or a difference in directivity of each antenna element, etc. As a result, it is likely that the amplitude of each element of a steering vector shows variation. In this case, the evaluation results of the variation amount of amplitudes of the elements of the first eigenvector include the gain difference, and it is difficult to interpret the derived value as the similarity index. On the other hand, the absolute value of the inner product can be the index indicating the degree of similarity between a single wave steering vector and the first eigenvector even if there are antenna gain variation among antenna elements. In addition, if the amplitude variation is used as the index, only amplitude information is used, whereas if the inner product is used as the index, the phase difference between elements can be measured as shape differences. In an extreme case, the amplitudes of all elements of the steering vector and the first eigenvector are the same, and the phases of the same element of two vectors are different. In this case, a steering vector and the first eigenvector exhibit different shapes. This type of difference in shape due to the phase difference between the steering vector elements and the first eigenvector elements cannot be detected based on the amplitude variation. On the other hand, this type of difference in shape due to the phase difference between a steering vector elements and the first eigenvector elements can be detected based on the inner product. Accordingly, by using the absolute value of the inner product, the difference in shape between a steering vector and the first eigenvector can be detected more effectively.

Here, the steering vector is assumed to be a single wave steering vector. The single wave steering vector is desired to be the steering vector corresponding to the estimated AoA. In this case, the estimated AoA is necessary for calculation of the index. FIG. 6 illustrates the configuration of the wireless system in that the AoA is used for calculation of the similarity index. FIG. 6 differs from FIG. 1 in that an output of the AoA estimator 6 is also input to the index calculator 8.

In FIG. 6, the index calculator 8 generates a steering vector corresponding to the input AoA, and calculates an index indicating the degree of similarity between the steering vector and the first eigenvector. The other configurations are the same as those in FIG. 1. Accordingly, the explanation thereof will be omitted.

Figure 7:
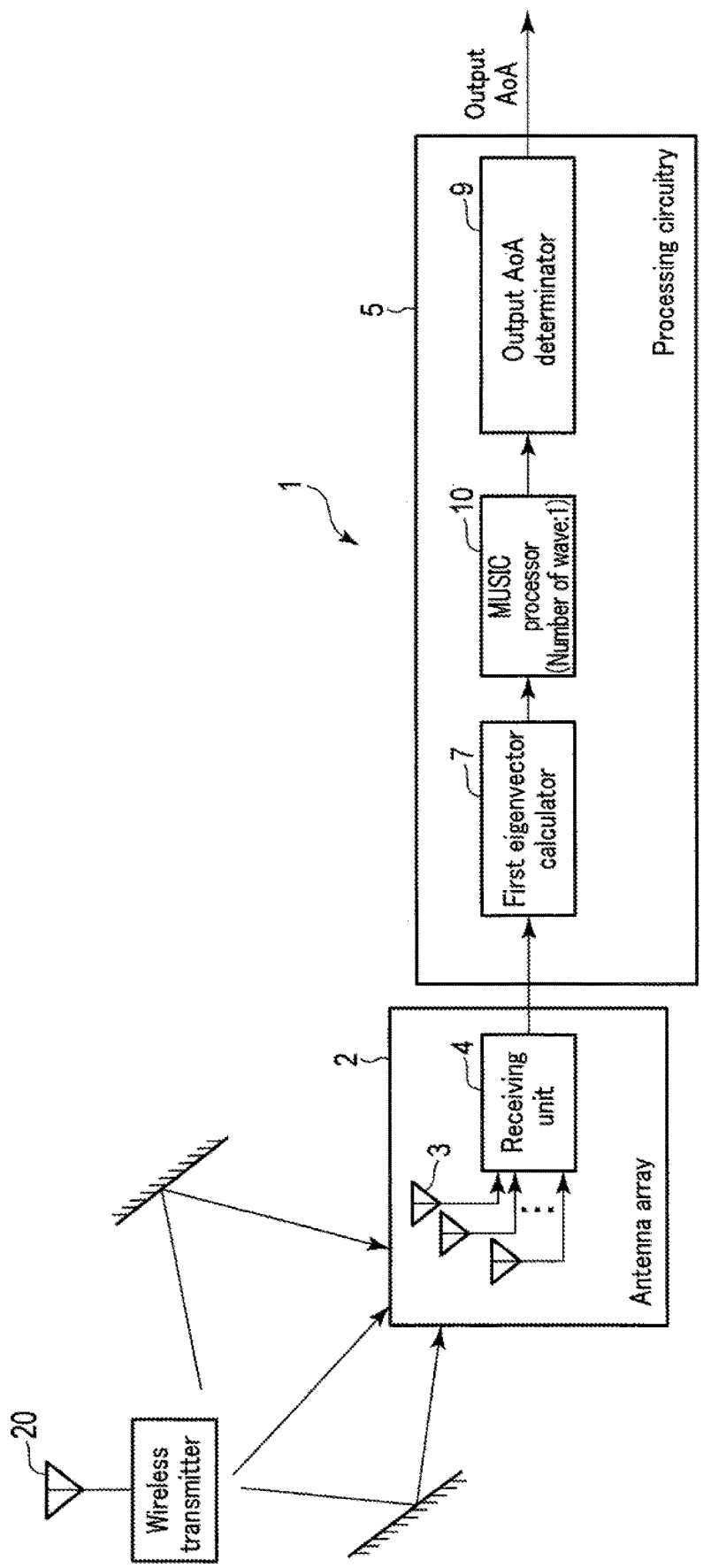
FIG. 7 illustrates the configuration of a wireless system in which an AoA estimator and an index calculator are substituted by a MUSIC processor.

In the case where an AoA is estimated via MUSIC algorithm, the absolute value of the inner product is calculated at the same time that the AoA is estimated. In this case, as shown in FIG. 7, the AoA estimator 6 and the index calculator 8 can be replaced with the MUSIC processor 10. In this example, the size of signal subspace, i.e., the number of signal waves of MUSIC algorithm used in the MUSIC processor 10 is one.

In MUSIC algorithm, the number of signal waves is assumed; eigenvalue decomposition is performed; eigenvectors are arranged in the order of the magnitudes of corresponding eigenvalues; noise subspace $E_N$ is derived after the elimination of eigenvectors equal to the number of the signal waves from the largest eigenvalue; the orthogonality between the noise subspace and steering vectors is evaluated using the cost function $P_{MU}$ referred to as a MUSIC spectrum; and an angle indicating a peak value is searched since it is highly likely that a signal has been incident from an angle with a higher MUSIC spectrum value. The MUSIC spectrum is described below.

$$P_{MU}(\Theta) = \frac{a^H(\Theta)a(\Theta)}{a^H(\Theta)E_N E_N^H a(\Theta)} \quad (6)$$

In equation (6), a correction between a noise subspace and a steering vector is included in the denominator. The correlation is obtained by converting the inner product of the noise subspace and the steering vector into norm 2. The numerator of equation (6) is to normalize the length of the steering vector in the denominator, and is not required if the length of the steering vector is normalized in advance.

On the other hand, as can be assumed from the similarity to the two-dimensional or three-dimensional real number space, a squared sum of inner products of certain vector and orthogonal axes (for example, x-, y-, and z-axes) of the space including the vector is equal to the square of the length of the original vector (norm 2).

The vector column obtained by eigenvalue decomposition of the full rank covariance matrix is an orthonormal system which can be a base of the space including the vector. Namely, all vectors within the space can be represented by all the eigenvectors obtained by eigenvalue decomposition.

If the number of waves of signal subspace is one, and an AoA is estimated via MUSIC algorithm, the noise subspace includes all eigenvectors other than the first eigenvector. The squared sum of the inner products is the square of the length of the original vector, and the length of the original vector (i.e., the length of the steering vector) is normalized and constant. Thus, the value obtained by subtracting the denominator of equation (6) from the square of the length of the steering vector is equal to norm 2 of the inner product of the first eigenvector and the steering vector, since the size of the signal subspace is one. Accordingly, the square root of this value is the absolute value of the inner product of the first eigenvector and the steering vector. The square root of a value obtained by subtracting a reciprocal of the MUSIC spectrum from 1 (if the length of the steering vector is 1) is the absolute value of the inner product used as the aforementioned index. The absolute value of the inner product is calculated at the same time at which the AoA estimation via MUSIC algorithm is performed.

The absolute value of the inner product and the value of the MUSIC spectrum have a monotonically increasing relationship, and have a one-to-one correspondence. Thus, the MUSIC processor 10 may convert the MUSIC spectrum into the absolute value of the inner product and output the converted value, or may output the height of the MUSIC spectrum as the index. Namely, the MUSIC processor 10 may calculate the MUSIC spectrum where the number of signal waves is one, output an angle indicating a peak value of the MUSIC spectrum as the AoA, and output the peak value as the index. The operation of the output AoA determinator 9 is similar to that stated above. However, the range and the way of change of the peak value of the MUSIC spectrum differs from these of the absolute value of the inner product. Accordingly, if the peak value of the MUSIC spectrum is used as an index compared with a threshold or as a weight of summation, a threshold needs to be adjusted, or a conversion function, etc. for weighting needs to be adjusted, according to the difference in the range and changing way. By simplifying the calculation of the index, it is possible to perform estimation of an AoA and calculation of the index simultaneously, and also to reduce the amount of calculation.

The features of the absolute value of the inner product and the value of the MUSIC spectrum having a monotonically increasing relationship and a one-to-one correspondence indicates that the angle in which the absolute value of the inner product exhibits a peak value can be adopted as the estimated AoA in the MUSIC algorithm by using the absolute value of the inner product instead of the MUSIC spectrum. In this case, there is no need to obtain all eigenvectors of the covariance matrix differently from the normal MUSIC algorithm, and AoA estimations via the MUSIC algorithm can be performed only by obtaining the first eigenvector. If only the first eigenvector is calculated, the speed of calculation can be greatly increased by a power iteration, etc. Through this process, the amount of calculation which is a problem of MUSIC algorithm can be reduced.

In an example of FIG. 7, if eigenvalue decomposition is performed to obtain all eigenvectors, the first eigenvector calculator 7 calculates the other eigenvectors as well as the first eigenvector. The MUSIC processor 10 estimates an AoA via the normal MUSIC algorithm. The MUSIC processor 10 outputs the estimated AoA to the output AoA determinator 9, and outputs the height of the MUSIC spectrum to the output AoA determinator 9 as the index. On the other hand, if only the first eigenvector is used for AoA estimation via the MUSIC algorithm, the first eigenvector calculator 7 calculates only the first eigenvector. The MUSIC processor 10 estimates an AoA by calculating the absolute value of the inner product instead of the MUSIC spectrum. The MUSIC processor 10 outputs the estimated AoA to the output AoA determinator 9, and outputs the absolute value of the inner product to the output AoA determinator 9 as the index.

Next, the processing by the output AoA determinator 9 will be described. As stated above, the wireless receiver 1 performs multiple measurements. The output AoA determinator 9 determines the most likely output AoA based on a plurality of AoAs and the indices corresponding to AoAs obtained from the results of the multiple measurements. As stated above, the measurements may be performed at different times as shown in FIG. 3, or at the same time as shown in FIG. 5. Furthermore, it may be possible to adopt a sliding frame scheme in which measurement results are selected by a predetermined length of frame from the time-sequentially performed measurement results, and the start time of the frame is shifted every time a new measurement result is input.

Figure 8:
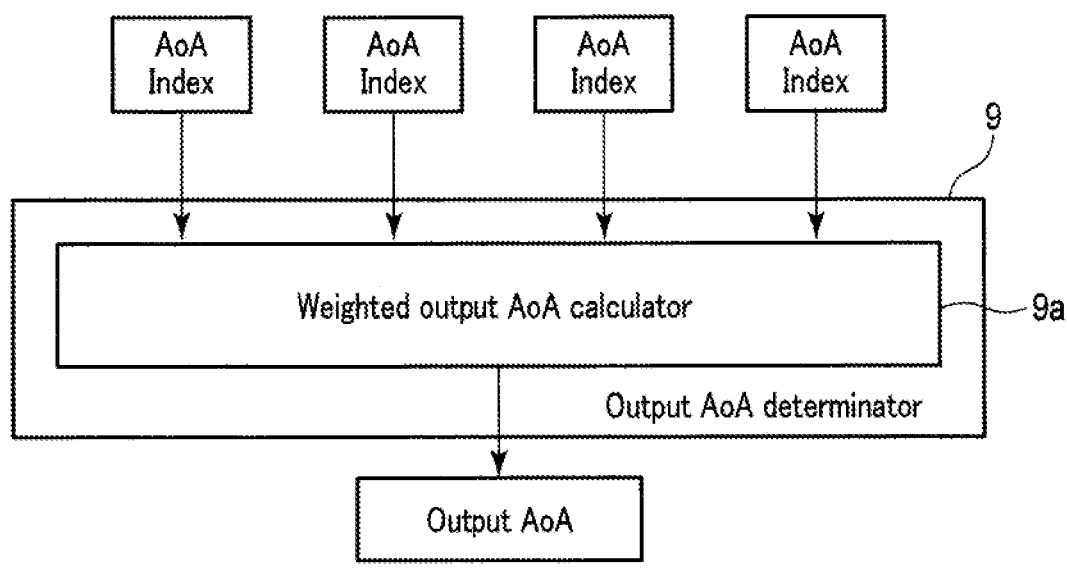
FIG. 8 is a diagram showing a concept of the processing in an output AoA determinator.

FIG. 8 is a diagram showing a concept of the processing in the output AoA determinator 9. In FIG. 8, the output AoA determinator 9 includes a weighted output AoA calculator 9a. The weighted output AoA calculator 9a calculates an output AoA weighted in a broad sense by using the AoA estimated by the AoA estimator 6 and a value calculated by a function of an index calculated by the index calculator 8. There are a plurality of methods of weighting.

Figure 9:
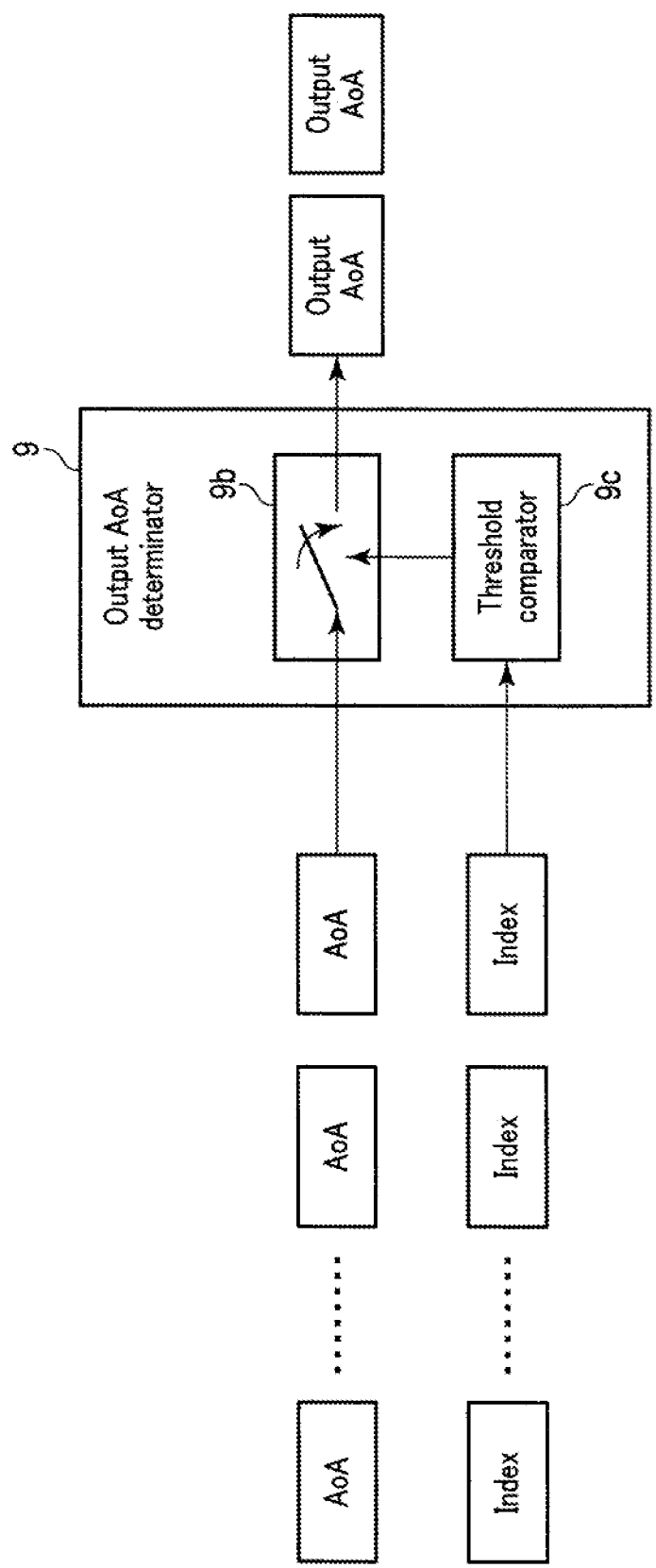
FIG. 9 illustrates an example of the processing in the output AoA determinator.

For example, the output AoA determinator 9 in FIG. 9 includes a switch 9b and a threshold comparator 9c as an example of the weighted output AoA calculator 9a. The switch 9b outputs an output AoA in which true or false weighting is performed to an input AoA. The threshold comparator 9c compares an input index with a threshold, and decides a weight to be applied to the switch 9b, in accordance with the comparison result. The threshold comparator 9c sets a true weight to the switch 9b if the index is equal to or greater than the threshold, and sets a false weight to the switch 9b if the index is less than the threshold. The switch 9b in which the false weight has been applied switches the output of the output AoA off, and the switch 9b in which the true weight has been applied switches the output of the output AoA on. The switch 9b and the threshold comparator 9c are implemented by a program or logic circuitry.

In the example of FIG. 9, the results of the measurements are time-sequentially input to the output AoA determinator 9. The result of comparison between the index and the threshold is a logic value. If the index is equal to or greater than the threshold, the AoA will be output as a valid value. If the index is less than the threshold, the AoA is determined as an invalid value, and will not be output.

Figure 10:
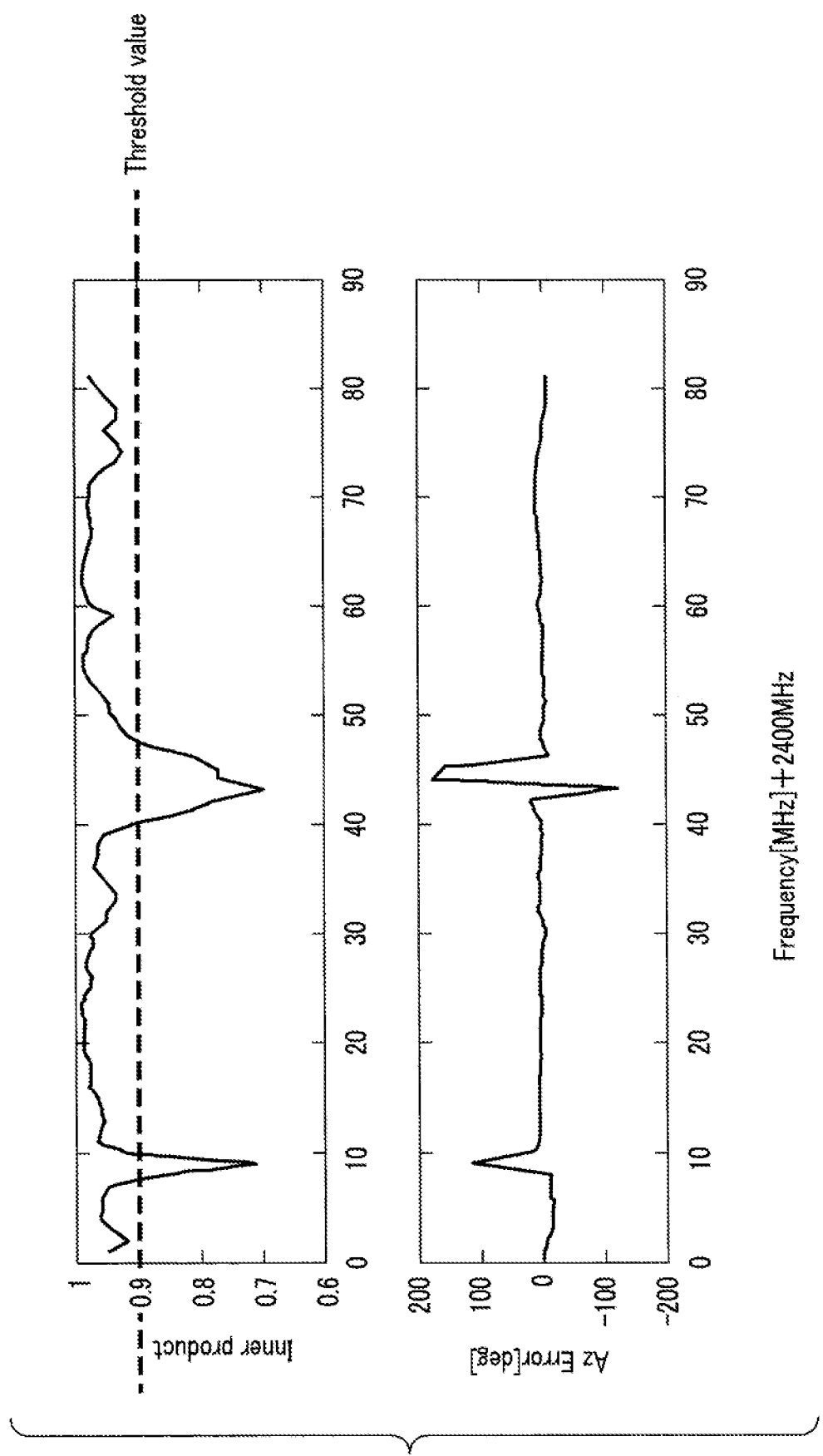
FIG. 10 illustrates an example of a threshold applied to similarity indices.

In the example shown in FIG. 10, the threshold is set within the range of approximately 0.9 and 0.95, for example. In practice, the threshold may be determined by examining the relationship between the index and the outlier generation rate considering the condition such as the number of antenna elements used by the wireless receiver 1, the covariance matrix generation, etc., so that the outlier generation rate becomes equal to or less than a desired value.

In the example of FIG. 9, it is an advantage that all valid measurement values can be used. On the other hand, in the example of FIG. 9, even if measurements are performed at temporally regular intervals, there may be cases where no output AoA is output. Accordingly, it is necessary to change the method to process the output AoA at the postprocessing stage. In the case where tracking of angles is performed at the postprocessing stage, if time interval is used as a tracking parameter, unequal interval tracking may be performed. If Kalman filtering is used, in many cases, the derivative value (time differential value) of the state parameter as well as the state parameter are tracked. In this case, the time interval to be multiplied by the time difference value is appropriately changed in accordance with the output time of the output AoA. Even in Kalman filtering, if tracking is performed only to a state parameter, not to the time difference value, the time interval of output of the output AoA is not necessary to be considered even if the interval is not regular. However, if the output AoA cannot be output for as frequently as expected, there may be cases where the difference between the previously output value and the subsequently output value becomes large, and tracking cannot be successfully performed. In such cases, it is preferable to perform an error procedure in accordance with the output interval, for example, discarding the previous state value and restarting tracking again, or decreasing the contribution of the previous value, etc.

As a modification, the index calculator 8 may subtract the threshold value from the calculated index in advance, truncate negative values to zero, and input the resultant value to the output AoA determinator 9 as a new index. Alternatively, the index calculator 8 may subtract a threshold value from the calculated index, truncate negative values to zero, multiply the resultant value by a factor, and input this resultant value to the output AoA determinator 9. If the absolute value of the inner product of the first eigenvector and a single wave steering vector is applied as the index, the threshold is set close to one, as shown in FIG. 10. In this case, the range used as the index will be approximately 1/10 of the entire range. Accordingly, the comparison with the threshold can be facilitated by subtracting the threshold value from the calculated index, truncating negative values to zero, multiplying the resultant value by a factor, and inputting this resultant value to the output AoA determinator 9.

The output AoA determinator 9 may be configured to always output an output AoA at regular intervals. FIG. 11 shows an example. In the example of FIG. 11, multiple sets of an AoA and an index (four sets for each input in FIG. 11) are input to the output AoA determinator 9. For example, the output AoA determinator 9 in FIG. 11 includes an AoA selector 9d as an example of the weighted output AoA calculator 9a. The AoA selector 9d selects an AoA with the best index from among the input AoAs, as an output AoA. The best index is an index closest to one among four indices if the absolute value of the inner product of the first eigenvector and a plane wave steering vector is used as the index. The AoA selector 9d is implemented by a program or logic circuitry.

In the example of FIG. 11, the output AoA is output at stable intervals. Accordingly, the processing such as tracking, etc. at the postprocessing stage can be facilitated. However, since one of the four output AoAs needs to be selected, if all four of the output AoAs input to the output AoA determinator 9 are unsuitable, the selected one is also unsuitable. In contrast, if all four of the output AoAs input to the output AoA determinator 9 are suitable, only one of the output AoAs is output.

As stated above, in the example of FIG. 11, the output AoA determinator 9 outputs one of the four output AoAs. However, the number of output AoAs is not limited thereto. For example, the output AoA determinator 9 may be configured to output one of five output AoAs, or to output two output AoAs corresponding to the best and the next best indices among four indices.

Figure 12:
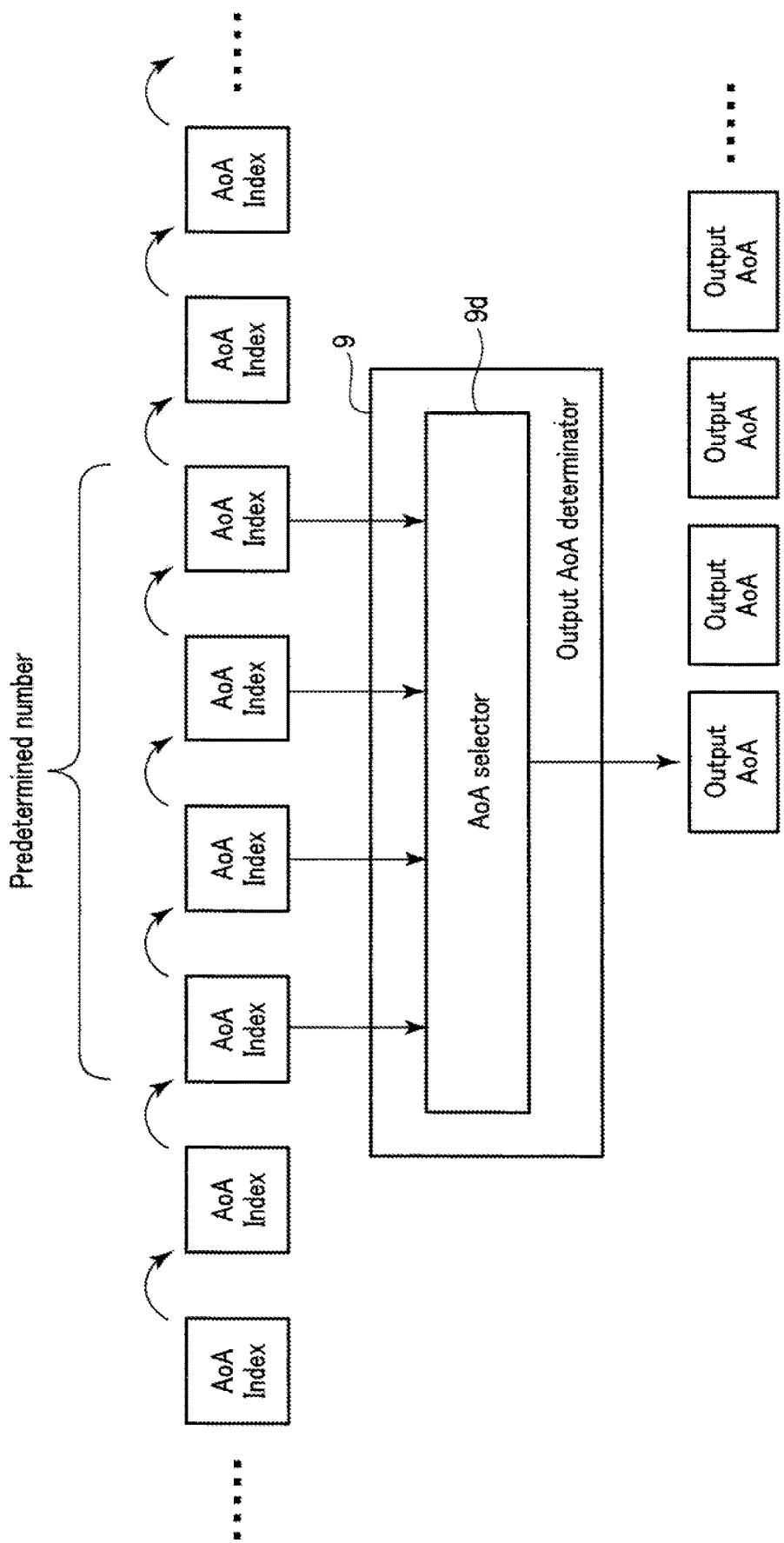
FIG. 12 is a diagram to explain another example of the processing in the output AoA determinator.

FIG. 12 is a diagram to explain another example where the output AoA is output at regular intervals. In FIG. 12, the output AoA determinator 9 acquires multiple sets of an AoA and an index—for example four sets for consecutive measurements (not for different measurements) via sliding frames. Namely, the AoAs and the indices are consecutively acquired, and time-sequentially input to the output AoA determinator 9. The AoA selector 9 outputs an AoA corresponding to the best index from among a predetermined number of AoAs, for example, four AoAs, as an output AoA, in a similar manner to FIG. 11. In this case, one of the four sets is sequentially replaced with a new set.

In consideration of the measurement time interval and the output time interval in which the output AoA is needed, the slide amount is not limited to one. The slide amount may be two or three. If the slide amount is four, the processing is the same as that shown in FIG. 11. In the example of FIG. 12, the output frequency of the output AoA can be increased in comparison with the example of FIG. 11.

In the example of FIG. 12, in the environment where index values vary widely, if an AoA with the optimal index is input, the output AoA determinator 9 outputs the AoA while the AoA is included in the four sets. In this case, the change in the values of the AoAs becomes small, and this may adversely affect the postprocessing tracking. Thus, in the example of FIG. 12, weighting in a narrow sense may be applied as well. The AoA may be weighted by the index value, or by a new index value obtained by converting the index based on a particular function. This conversion may be performed so that the values of expected errors of the AoAs are inversely proportional to the converted index values.

Weighting related to time may be applied so that the contribution of old AoAs will be decreased. For example, the output AoA determinator 9 performs weighting so that the weights grow greater from the oldest AoA to the newest AoA, in addition to the weighting using the index. Through this processing, the undesirable poor change in the values of the AoA is avoided. Accordingly, the tracking performance to the change in the wireless transmitter 20 position is improved.

The weighting in a narrow sense which uses the index may be applied to the example of FIG. 11. In the example of FIG. 11, by applying the weighting in a narrow sense, if more than one AoAs with good indices are input, weighted average is applied and the accuracy of AoA will be improved.

In the measurements as stated above, it is assumed that the frequency is changed, or a broadband signal is subjected to bandwidth division. Any other measurement scheme which induces change in multipath states can be adopted. Accordingly, it is not indispensable to change a frequency between the measurements. For example, the measurements may be performed shown in FIGS. 13A and 13B. Specifically, while the position of the wireless transmitter 20 is time-sequentially changed from positions (1) to (N), as shown in FIG. 13A, radio waves S11 to SIN transmitted from the wireless transmitter 20 from each position are received by the wireless receiver 1, as shown in FIG. 13B.

If the distance that the wireless transmitter 20 moves between a measurement interval is equal to or greater than the length of the wavelength of radio waves transmitted from the wireless transmitter 20, the multipath state may change in the environment where there are many reflective objects, such as indoors. In this case, even if radio waves of the same frequency are transmitted, the wireless receiver 1 may obtain the change in multipath state to the same degree as in the case where the frequency of radio waves is changed.

Figure 13A:
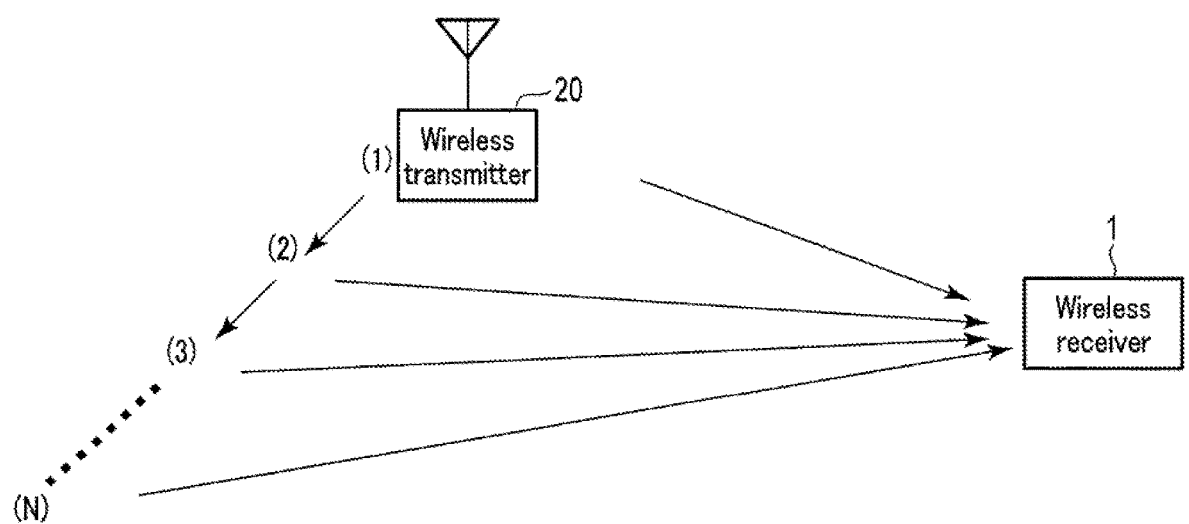
FIG. 13A illustrates another example of measurements performed while a wireless transmitter moves.
Figure 13B:
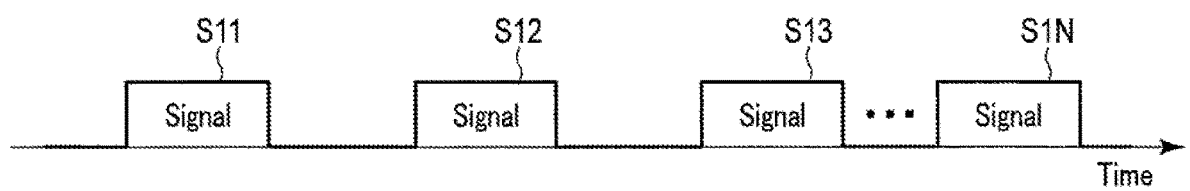
FIG. 13B illustrates another example of measurements performed while a wireless transmitter moves.

It is not necessary that only the wireless transmitter 20 moves as shown in FIG. 13A. It is sufficient that the relative position between the wireless receiver 1 and the wireless transmitter 20 changes time-sequentially. Accordingly, the wireless receiver 1 may move, or both the wireless receiver 1 and the wireless transmitter 20 may move. In addition, a reflective object (for example, a human) to generate radio wave environments between the wireless receiver 1 and the wireless transmitter 20 may move.

As explained above, in the method of determining the output AoA by using the degree of similarity between the first eigenvector and a single wave steering vector as the index, the output AoA can be determined even if power is difficult to be used as the similarity index. In contrast, in the case where power is relatively reliable as the index such as a radar, the performance in determining the output AoA can be improved by using both the power and the degree of similarity between the first eigenvector and a plane wave steering vector.

Figure 14:
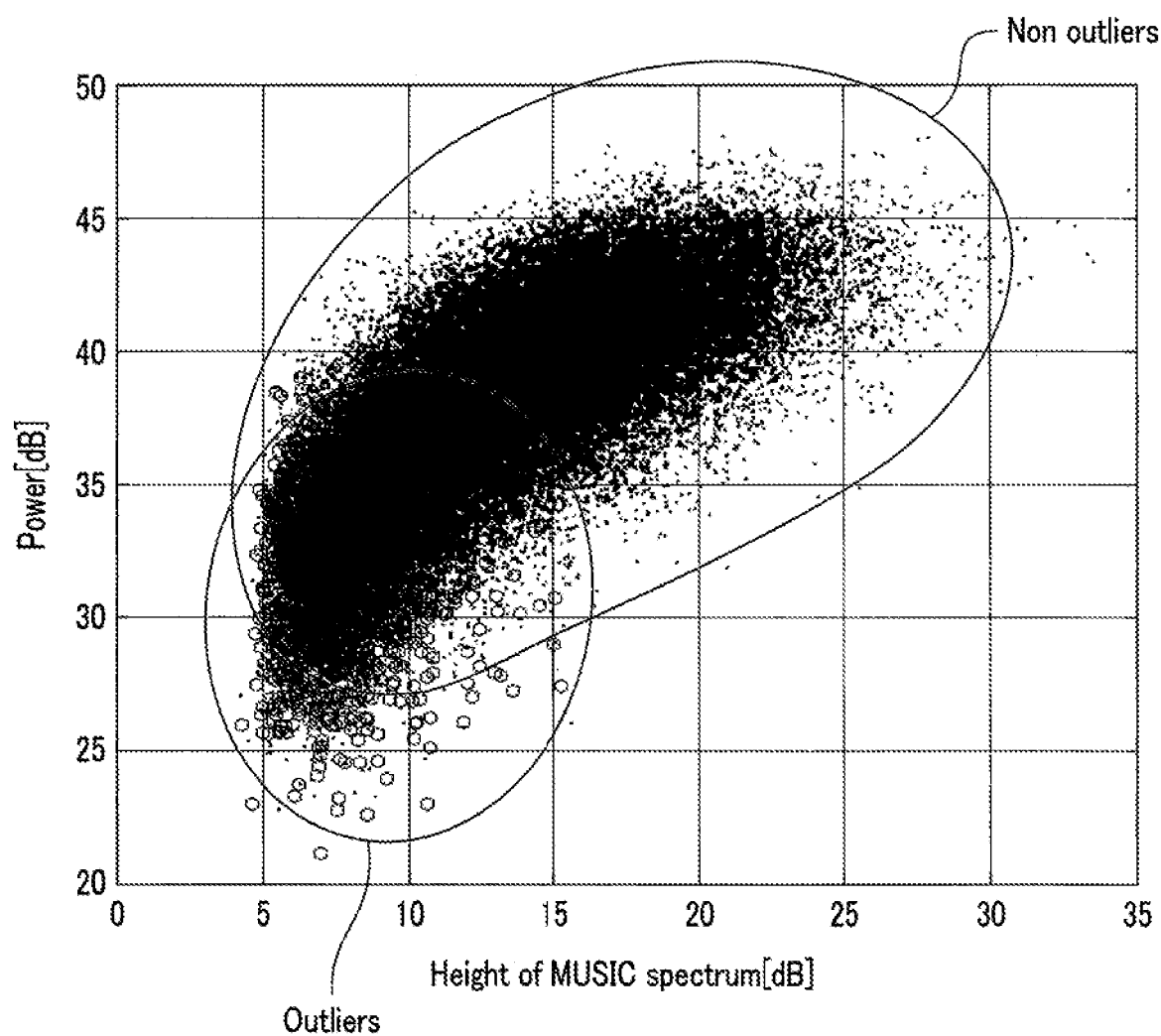
FIG. 14 is a graph showing the results of an example azimuth measurement simulation in the multipath environment.

FIG. 14 is a graph showing the results of an example azimuth measurement simulation in the multipath environment. In FIG. 14, values whose azimuth error is equal to or greater than 50 degrees are plotted as circles, and values whose azimuth error is less than 50 degrees are plotted as dots. In FIG. 14, the abscissa represents the height of MUSIC spectrum when estimation of an AoA is performed via the MUSIC algorithm where the number of signal waves is one, and the ordinate represents received power. As stated above, the height of the MUSIC spectrum is an index indicating the degree of similarity between the first eigenvector and a single wave steering vector. As shown in FIG. 14, in the results of the azimuth measurement simulation, there are outliers which are low both in the power and the height of the MUSIC spectrum, and also outliers which are low in terms of either the power or the height of the MUSIC spectrum. It may be determined that an AoA has low reliability when both of the power and the height of the MUSIC spectrum are low, or when at least either one of the power and the height of the MUSIC spectrum is low. As can be seen from the above, it is understood that the determination of reliability of the AoA is expected to be improved by using both the power and the degree of similarity between the first eigenvector and a plane wave steering vector.

In FIG. 14, there are a great number of AoAs which do not differ from outliers in the index value, and yet are not outliers (plots in the common area between the area of "outliers" and the area of "non-outliers"). In the example of FIG. 9, if all of these AoAs are excluded as outliers, the time interval between outputs of the output AoA becomes too long, and there may be a case where tracking cannot be successfully performed. In this case, a threshold may be relaxed to allow inclusion of outliers, instead of setting a threshold which exclude all outliers. In this case, the output frequency of the output AoAs from the output AoA determinator 9 can be improved; however, outliers are included in the output AoAs. The included outliers may be excluded through the postprocessing tracking.

In addition, in the example of FIG. 11 or FIG. 12, if the goodness of an index corresponding to an AoA is higher than those of the other AoAs in the same frame, the AoA is output as an output AoA even though the index is not good. Accordingly, in the example of FIG. 11 or FIG. 12, the output AoAs may include outliers. If the output AoAs include outliers, it is desirable to take care of the outliers in the postprocessing, such as tracking.

FIG. 15 illustrates the configuration of a wireless system in which processing circuitry is configured to track an output AoA. As shown in FIG. 15, the processing circuitry 5 includes a tracker 11. The tracker 11 applies a tracking filter such as a Kalman filter to the output AoA input from the output AoA determinator 9, and performs tracking to the angle. The configuration shown in FIG. 15 includes the tracker 11 in addition to the configuration shown in FIG. 1. The tracker 11 may be added to the configuration shown in FIG. 6 or FIG. 7.

Tracking filters are designed to handle inputs and outputs with Gaussian noises in many cases. Accordingly, the performance is degraded if data including many outliers is input to the tracking filter. In addition, tracking filters calculate predicted estimates in most cases. Thus, the tracker 11 calculates the amount of deviation of the output AoA (measurement value) input from the output AoA determinator 9 from the predicted estimate, and excludes the output AoA as an outlier if the amount of deviation is greater than a threshold. Through this process, the tracker 11 performs tracking by using the output AoAs in which outliers are excluded.

FIG. 16 is an illustration of the processing of exclusion of an outlier. In FIG. 16, the abscissa represents time, and the ordinate represents AoAs. In FIG. 16, black dots indicate measurement values, namely, output AoAs input to the tracker 11. In FIG. 16, a broken line indicates a trajectory of angles obtained from the results of tracking, and a white dot indicates a predicted estimate of an output AoA calculated during tracking. In the example of FIG. 16, a measurement value which is significantly deviated from the predicted estimate indicated by the white dot is excluded as an outlier. FIG. 16 also includes a measurement value that is significantly deviated from a predicted estimate (broken line) calculated prior to the white dot. Exclusion of outliers may be performed every time a predicted estimate is calculated.

If an output AoA is excluded as an outlier, no output AoA is input at that time. To compensate for it, calculation of tracking may be performed by expanding the time interval to the next input, in a similar way to the aforementioned unequal interval tracking, or tracking may be performed by using a predicted estimate.

Exclusion of outliers through tracking is performed on the assumption that the frequency of outlier occurrence is low, and prediction is correctly performed to some extent. Thus, if the frequency of outlier occurrence is too high, it is not possible to select correct value, resulting in erroneous exclusion of outliers.

Through the processing whereby the output AoA determinator 9 excludes outliers in advance to decrease the frequency of outlier occurrence, and the tracker 11 also excludes outliers, it is possible to mitigate the degradation of tracking performance due to an influence of outliers.

Next, another example of tracking processing will be explained. In Kalman filtering, an expected error covariance of measurement values is included in an equation of filter gain. In $\alpha\beta$ filtering, there is a constant to determine contribution of the difference between a predicted estimate and a measurement value to update estimate.

In the example of FIG. 15, the inclusion of outliers is allowed, and AoAs with inappropriate indices may be input to the tracker 11. In another example, the output AoA determinator 9 outputs an output AoA along with the corresponding index. In this case, the tracker 11 adjusts a value of gain based on the index, when calculating a gain of the tracking filter. Namely, the tracker 11 decrease the gain value for an output AoA with a bad index. FIG. 17 is a graph where the abscissa represents the height of MUSIC spectrum, and the ordinate represents the azimuth error, in which data shown in FIG. 14 is plotted. In FIG. 17, values whose azimuth error is equal to or greater than 50 degree are plotted as circles, and values whose azimuth error is less than 50 degree are plotted as dots.

For example, it is assumed that inclusion of outliers is allowed to some extent, and the output AoA determinator 9 outputs an output AoA by applying a threshold of 9dB to the height of the MUSIC spectrum. Even if most of samples indicated by circles are excluded in advance through exclusion of outliers before tracking, it is likely that the azimuth error is greater for a sample with a lower index. In FIG. 17, the distribution of values indicated by crosses grow wider as the index becomes lower.

Accordingly, if a variance of expected AoA error for each index value is calculated beforehand, the variance can be used for gain adjustment when tracking.

In the case where the output AoA determinator 9 outputs to the tracker 11 the same AoA value as the AoA estimator 6, for example, the case where the output AoA determinator 9 selects and outputs one of the plurality of AoAs, or selects on or off, the output AoA determinator 9 may output an index corresponding to the AoA to the tracker 11. However, in the case where the output AoA determinator 9 calculates an output AoA by weighting synthesis, the index is preferred to be output after being subjected to weighting synthesis in accordance with the used weight. Through this processing, more accurate tracking is accomplished.

The postprocessing of the tracker 11 may include processing regarding position estimation. There is a case where a position of the wireless transmitter is estimated by a plurality of parameters measured by wireless receiver(s). For example, a wireless receiver estimates a position of the wireless transmitter based on the measured angle (azimuth and elevation angle) as well as the distance. In addition, for example, a plurality of wireless receivers whose positions are known by one another measure the angle of the same wireless transmitter, and the position of the wireless transmitter is estimated by an intersection point of extended lines of the measured angles, or the closest point if they are not crossed.

In these examples, if tracking of the position of the wireless transmitter is performed, exclusion of an outlier is preferably performed at a stage where the number of parameters is fewer, such as a single parameter. At a state where parameters have been synthesized to estimate a position, an outlier of any one of the AoAs may make the estimated position an outlier, and the frequency of outlier occurrence is significantly increased. Accordingly, it is desirable for each parameter to be independently tracked, the position to be estimated by synthesizing the tracking results, and the position to be tracked, instead of using the output AoA, etc. as is for tracking.

Figure 18:
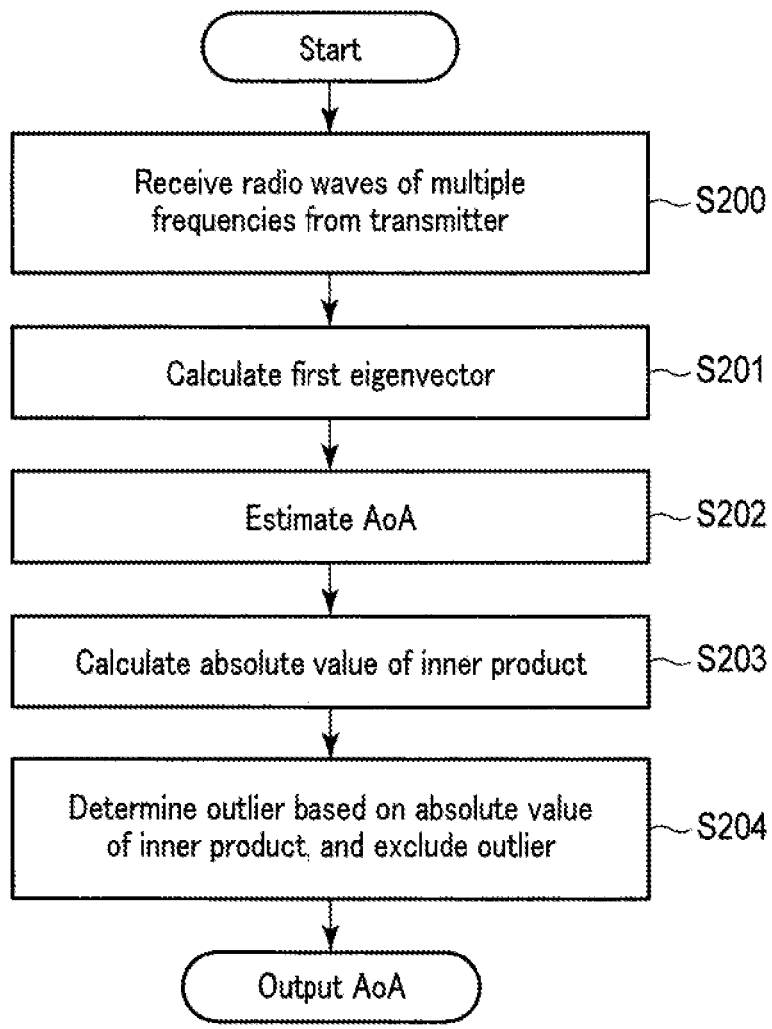
FIG. 18 is a flowchart of the algorithm of a wireless receiving method according to an embodiment.

FIG. 18 is a flowchart of the algorithm of a wireless receiving method according to the present embodiment. The processing shown in FIG. 18 is performed by the antenna array unit 2 and the processing circuitry 5. The processing performed by the processing circuitry 5 described below is not limited to the processing executed in accordance with a program stored in the memory. The processing of the processing circuitry 5 may be executed by an algorithm created in accordance with the hardware description language, such as an ASIC, an FPGA, etc.

The antenna array unit 2 receives radio waves of multiple frequencies from the wireless transmitter 20, and acquires received signals (S200).

The processing circuitry 5 calculates the first eigenvector from the covariance matrix of the received signal for each frequency (S201).

The processing circuitry 5 estimates an AoA from the received signal for each frequency (S202). As described above, estimation of the AoA is performed by a method where eigenvalue decomposition of the covariance matrix of the received signal, such as MUSIC algorithm, a monopulse method, or a beamformer method, etc.

The processing circuitry 5 calculates the absolute value of an inner product of the first eigenvector and a steering vector corresponding to the estimated AoA as an index for each frequency (S203). As described above, the index is not limited to the absolute value of the inner product of the first eigenvector and a steering vector. The index includes various types of functions calculated by the inner product of the first eigenvector and a steering vector. In addition, if the MUSIC algorithm is used for estimation of an AoA, the index may be the height of the MUSIC spectrum.

The processing circuitry 5 determines whether or not the corresponding AoA is an outlier, based on the calculated index, and determines an output AoA by excluding the outlier (S204).

Through the processing shown in FIG. 18, the outliers generated by multipath can be detected and excluded in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A wireless receiver comprising:
an antenna array configured to receive radio waves from a radio wave radiator to output received signals; and
processing circuitry configured to:
calculate similarity indices based on (1) a first eigenvector corresponding to a largest eigenvalue of a covariance matrix of each of the received signals, and (2) a degree of similarity between the first eigenvector and a steering vector of a single wave, estimate angles of arrival of the received signals, and, determine an output angle of arrival from the estimated angles of arrival of the received signals and the similarity indices.

2. The wireless receiver according to claim 1, wherein the radio wave radiator is a wireless transmitter.

3. The wireless receiver according to claim 1, wherein radio waves from the radio wave radiator have a plurality of frequencies.

4. The wireless receiver according to claim 1, wherein a broadband signal from the radio wave radiator is received, and bandwidth division to the received broadband signal is performed.

5. The wireless receiver according to claim 1, wherein the processing circuitry calculates an absolute value of an inner product of the first eigenvector and a steering vector corresponds to the angle of arrival, or a value determined by the absolute value of the inner product, as the similarity index.

6. The wireless receiver according to claim 5, wherein the processing circuitry is configured to:
estimate the angle of arrival via Multiple Signal Classification (MUSIC) algorithm where a number of waves of signal subspace is one, and
determine a peak value of a MUSIC spectrum calculated via the MUSIC algorithm as the index.

7. The wireless receiver according to claim 1, wherein the processing circuitry configured to:
Perform weighting using the index corresponding to each of the angles of arrival and
determine the output angle of arrival.

8. The wireless receiver according to claim 7, wherein the processing circuitry is configured to determine all angles of arrival whose corresponding indices are equal to or greater than a threshold among the angles of arrival as the output angles of arrival.

9. The wireless receiver according to claim 7, wherein the processing circuitry is configured to determine the angle of arrival whose corresponding index is most superior among the angles of arrival as the output angle of arrival.

10. The wireless receiver according to claim 1, wherein the processing circuitry is further configured to perform tracking of an angle of the radio wave radiator by using the output angles of arrival.

11. The wireless receiver according to claim 10, wherein the processing circuitry is configured to determine whether or not the determined output angle of arrival is to be used for tracking based on an amount of deviation between the determined output angle of arrival and a predicted estimate of the output angle of arrival.

12. The wireless receiver according to claim 10, wherein the processing circuitry is configured to change a gain used for tracking based on the index corresponding to the determined output angle of arrival.

13. A wireless receiving method, comprising:
calculating a first eigenvector corresponding to a largest eigenvalue of a covariance matrix of each of the received signals of radio waves from a wireless transmitter having a plurality of frequencies received by an antenna array;
estimating angles of arrival of the radio waves having the plurality of frequencies;
calculating an absolute value of an inner product of each first eigenvector and a steering vector corresponding to each of the angles of arrival as a similarity index;
determining whether or not each of the angles of arrival is an outlier based on the index; and
excluding an angle of arrival determined as the outlier from the angles of arrival, and determining an output angle of arrival.

14. A wireless system comprising:
a wireless transmitter configured to transmit radio waves of a plurality of frequencies; and
a wireless receiver configured to:
receive the radio waves of the plurality of frequencies from the wireless transmitter,
calculate a first eigenvector corresponding to a largest eigenvalue of a covariance matrix of a received signal output based on each of the received radio waves;
estimate angles of arrival of the radio waves having the plurality of frequencies;
calculate an absolute value of an inner product of each first eigenvector and a steering vector corresponding to each of the angles of arrival as a similarity index;
determine whether or not each of the angles of arrival is an outlier based on the index; and
exclude an angle of arrival determined as the outlier from the angles of arrival, and determines an output angle of arrival.

15. The wireless system according to claim 14, comprising a plurality of wireless receivers, wherein the plurality of wireless receivers each determine whether or not the determined output angle of arrival is to be used for tracking based on an amount of deviation between the determined output angle of arrival and a predicted estimate of the output angle of arrival, and track an angle of the wireless transmitter by using the output angle of arrival determined to be used for tracking, wherein the system uses results of tracking performed by the plurality of wireless receivers, and estimates a position of the wireless transmitter.

* * * * *